July 17, 1951     N. R. GUNDERSON     2,560,567

APPARATUS AND METHOD FOR USE IN COLOR REPRODUCTION

Filed Oct. 9, 1946     6 Sheets-Sheet 1

NORMAN R. GUNDERSON,
INVENTOR.

BY

July 17, 1951  N. R. GUNDERSON  2,560,567
APPARATUS AND METHOD FOR USE IN COLOR REPRODUCTION
Filed Oct. 9, 1946  6 Sheets-Sheet 2
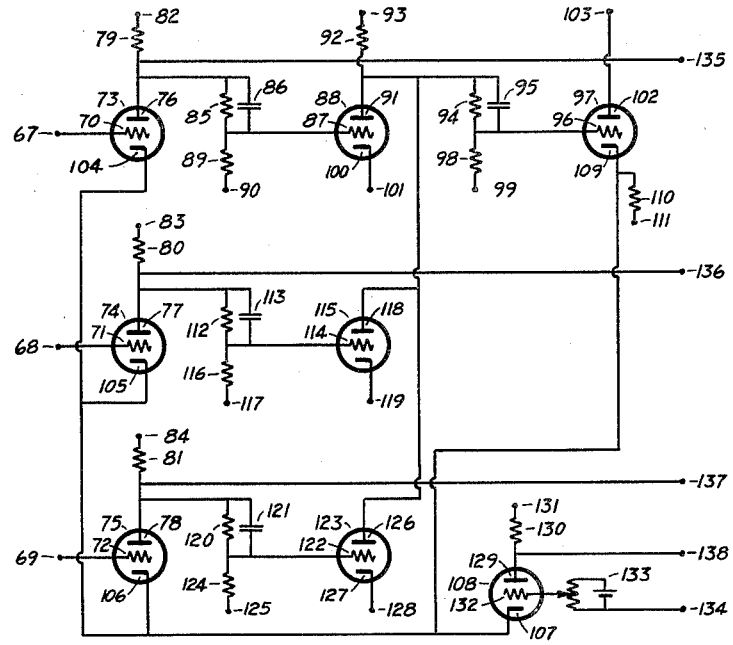
Fig. 4
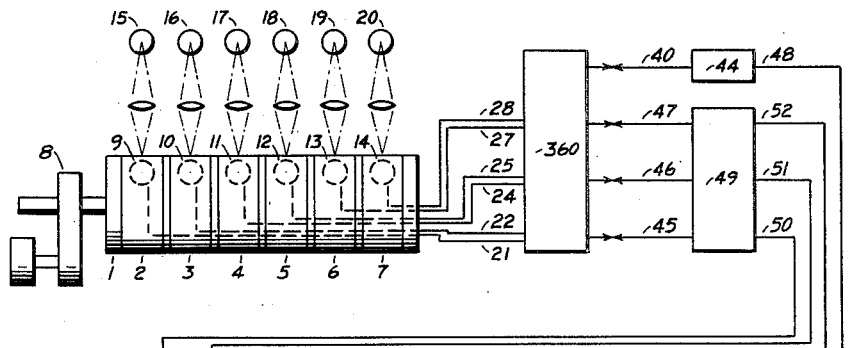
Fig. 3
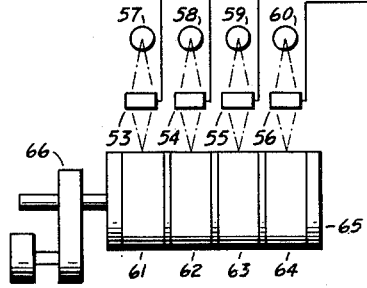
NORMAN R. GUNDERSON,
INVENTOR.
BY Norman R. Gunderson,
INVENTOR.

July 17, 1951     N. R. GUNDERSON     2,560,567
APPARATUS AND METHOD FOR USE IN COLOR REPRODUCTION
Filed Oct. 9, 1946     6 Sheets-Sheet 4
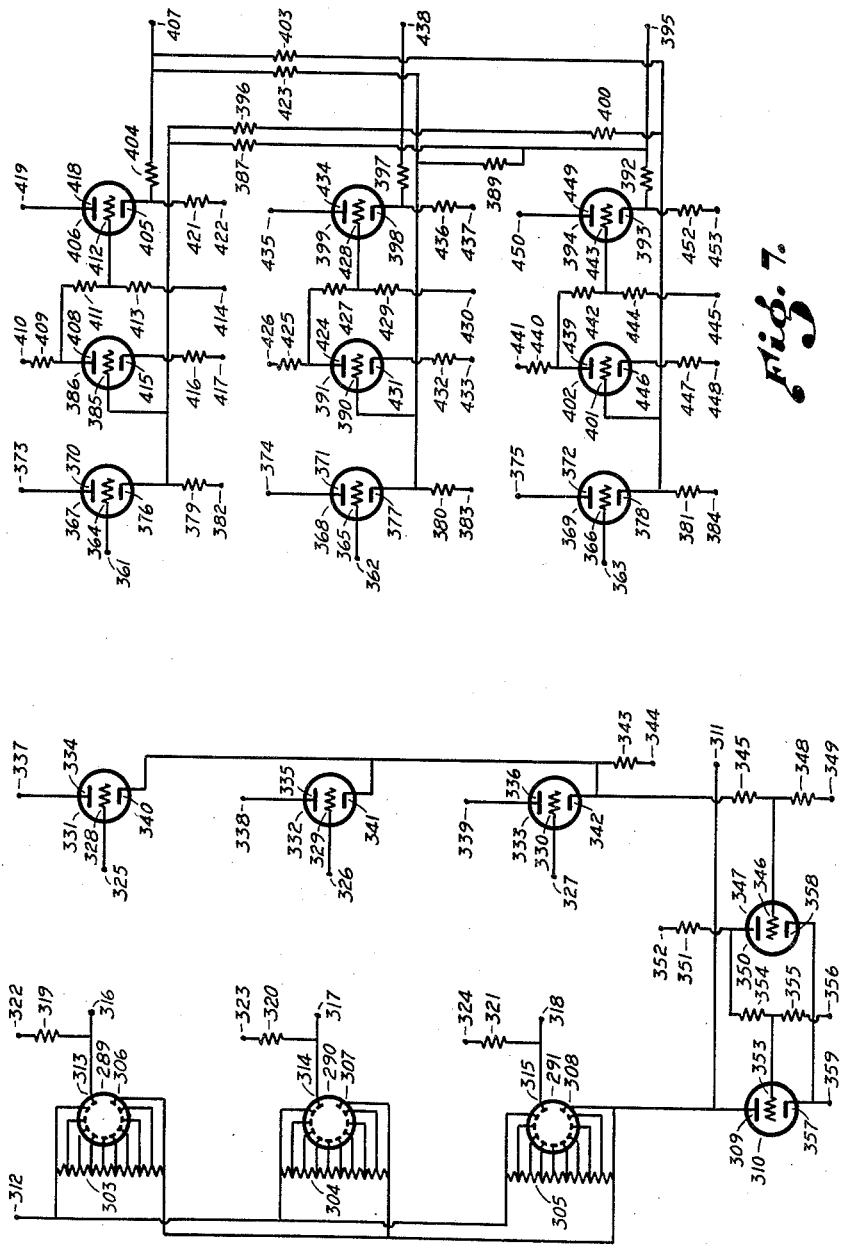
Norman R. Gunderson,
INVENTOR.
BY

NORMAN R. GUNDERSON,
INVENTOR.

NORMAN R. GUNDERSON,
INVENTOR.

Patented July 17, 1951

2,560,567

UNITED STATES PATENT OFFICE 2,560,567

APPARATUS AND METHOD FOR USE IN COLOR REPRODUCTION

Norman R. Gunderson, Pasadena, Calif.

Application October 9, 1946, Serial No. 702,173

14 Claims. (Cl. 178—5.2)

The present invention relates generally to a device, apparatus, system and methods particularly adapted for use in the rapid, economical and accurate reproduction of photographs, colored transparencies, maps or other pictorial representations, the reproductions being either in the form of prints or facsimiles for observation by reflected light or in the form of photographic color separation images, from which printing plates may be made for use in printing colored reproductions or facsimiles. These reproductions may be of the same or different size than the original and either in monochrome or in substantially natural color.

The invention is adapted to wire or wireless transmission of pictorial representations and permits colored prints or reproductions to be sent by wire or wireless with an accuracy and definition which has not been approached even by existing monochrome methods. More particularly, the present invention relates to a device, apparatus, system and method adapted to scan an original colored subject or pictorial representation or photographic color separation images thereof and to apply various colored inks and a black ink upon a suitable medium, such as paper or the like, for reproducing a true colored pictorial representation, facsimile or reproduction of the original colored subject. Also, the invention contemplates scanning an original colored subject, a pictorial representation or photographic color separation images thereof, and making a plurality of corrected color or chromatic photographic separation images and a black or achromatic photographic separation image, the various corrected color separation images being adapted for use in making a plurality of corrected color printing plates, or the like, and the black separation image being adapted for use in making a black printing plate, or the like.

The various corrected color printing plates are adapted to print correspondingly colored inks, or the like, and the corrected black printing plate is adapted to print black ink, or the like, for reproducing in color a true pictorial representation, facsimile or colored reproduction of a colored subject.

The particular forms of the invention described and illustrated herein, in the embodiments of this invention adapted to make colored pictorial representations or facsimiles, contemplate utilizing three distinct color channel inputs which are modified into three distinct color channel outputs and a black channel output. In the embodiments of this invention adapted for making corrected photographic color separation images and a black photographic separation image, three color channel inputs are also modified into three color channel outputs and a black channel output which are utilized in making the corresponding separation photographic images.

Both of these above mentioned color reproduction processes are of the type generally known in the art as a "four color process." However, this invention is not limited to said four color process or to the exact forms described herein. Although the various elements described in detail hereinafter have been correlated to an integrated system described to the above defined fields of endeavor, it is to be understood that many of such elements are individually novel and of great utility in many arts and uses removed from the specific field of endeavor to which these elements have been applied by me as disclosed herein.

The present application is a continuation-in-part of my application, Serial No. 426,220, filed January 9, 1942, now Patent No. 2,413,706. Said patent application includes the broad idea of photoelectrically scanning three photographic color separation images which have been made through suitable filters or the like, or other means for directing various spectral components to the various photographic mediums, and translating point to point light variations into varying electric signals in three associated corresponding color channels. The electric signals in the three color channels are then logarithmically amplified. The logarithmically amplified signals in the three color channels are then modified in the mixer. This modification consists of four steps. First, an equal value or grey voltage is subtracted from the signal in each color channel in order to "take out the black." Second, the signal in each color channel is changed by the addition or subtraction of a portion of the signal in each of the other two color channels. This step is done in order to correct for the overlapping spectral absorption characteristics of the reproducing colored inks. The third step is the selection of the color channel having the minimum response, that is, the channel corresponding to the minimum coverage of colored ink. Fourth, this minimum value or signal is used in regulating the value of the grey voltage which was previously subtracted from all three input color signals in an inverse feedback manner so that the value of the signal for the minimum selected color channel is regulated to an essentially constant value corresponding to essentially zero coverage of the corresponding colored ink. This has the effect of causing only the two color channels having the electric outputs corresponding to the greatest colored ink coverages to be effective at any one instant, the third instantaneously minimum output color channel being ineffective and causing no colored ink coverage for that channel.

The grey voltage mentioned above is utilized in generating or creating a fourth or black achromatic output signal in a black output channel.

The electric outputs of the various color channels and the electric output of the black channel are used for controlling suitable reproducing head means adapted to atomize, mix and spray the various colored inks and the black ink upon a suitable medium such as paper or the like in accordance with the three color output signals and the black output signal, thus making a color reproduction of the colored original.

This continuation-in-part of the before mentioned parent application embodies improvements over and above the parent application which adapts the invention to making theoretically correct colored pictorial representations, facsimiles or reproductions of the colored subject or for making correct photographic color separation images and a correct black separation photographic image adapted to make corresponding printing plates adapted to print correspondingly colored inks for making a true colored pictorial representation, facsimile or reproduction of the original colored subject.

It should, perhaps, be explained at this point that the reproducing head in the parent application above referred to, applies inks of the various colors and black ink upon a suitable surface in linear relation to the input signals to the reproducing head. Thus the density of the coverage of any or all of the various colored inks or the black ink is varied virtually linearly with respect to the signals received by the reproducing head from the color channels and the black channel, and since the color channel signals received by the reproducing head are logarithmic with respect to the light received by the photoelectric scanning means associated with each color channel, and since light received from the colored reproduction or facsimile made by spraying the colored inks and the black ink upon a suitable surface, is antilogarithmic or exponential with respect to the density of the inks forming the color reproductions, the light reflected from the color reproductions will have a linear relation to the light input to the photoelectric scanning means.

However, it has been found that if the above mentioned system is to be used in making three correct chromatic color separation photographic images and a correct black separation photographic image, the antilogarithm of the output signals in the color channels and the black channel should be preferably taken and used for controlling four linear light valves adapted to cooperate with four photosensitive films or the like, which may be mounted upon a rotating drum or the like for making four correct separation photographic images, three of which are color separation photographic images and the fourth of which is a black photographic separation image, and which may be used for making halftone printing plates or the like, in a manner well known in the art for making true color reproductions or facsimiles of a colored subject.

The extra step of taking the antilogarithm of the output signals of the color channels and the black channel when making the correct color separation photographic images and a correct black separation photographic image, as above described, is desirable because of the fact that within the normal exposure range of the film the density of a photographic image formed on a photographic film or the like, is virtually proportional to the logarithm of the light intensity exposing the film and the input signals to the light valves, whereas in the arrangements in the parent application the various colored inks and the black ink are sprayed on paper directly by the reproducing head for varying the density of the various colored ink coverages and the black ink coverage linearly with respect to the input signals to the reproducing head.

The present continuation-in-part includes means and methods for obtaining theoretically correct color reproduction. I have found that if true color reproduction is to be achieved and is to be based upon the use of three given real primary colors, the receptor for each color (a receptor being a material or device which undergoes some change when subjected to radiant energy in the form of light, and thus, may serve to record or indicate the amount of light it receives) must have a spectral sensitivity versus wave length curve which is negative in certain spectral regions. This is caused by a reason of the fact that no combination of three real primary colors can match spectrum colors unless negative values of at least one of the real primary colors are used, because spectrum colors are of a much deeper hue than any real colors obtainable. Therefore, perfect color reproduction requires that the receptors for the various colored channels under one of the general systems illustrated herein, comprise three pairs of photographic color separation photographic images which have been made through suitable filters having the desired spectral sensitivity, so arranged that one photographic separation image of each pair contains the positive portion of the spectral sensitivity versus wave length curve of the receptor and the other colored separation photographic image contains the mirror image of the negative portion of the spectral sensitivity versus wave length curve of that receptor which is adapted to be subtracted from the other curve. In other words, each color channel has two photographic color separation images and two photoelectric cells adapted to scan said images. These, together with the filters or the like, through which the images have been made, comprise a receptor.

There are three such receptors, each receptor in combination having the desired spectral sensitivity versus wave length curve, including both positive and negative values in different spectral regions.

The method used in determining the spectral sensitivity characteristics of the three receptors, is to first determine the trichromatic coefficients of the three real primaries to be used in color reproduction, $x_r y_r z_r$, $x_g y_g z_g$, $x_b y_b z_b$ (Hardy's "Handbook of Colorimetry," pages 9–13). The required spectral sensitivity versus wave length characteristics of the three receptors in then determined by the following set of linear equations:

$$x_r S_r + x_g S_g + x_b S_b = \bar{x}$$
$$y_r S_r + y_g S_g + y_b S_b = \bar{y}$$
$$z_r S_r + z_g S_g + z_b S_b = \bar{z}$$

where $S_r$, $S_g$ and $S_b$ are the desired spectral sensitivities of the three receptors and $\bar{x}$, $\bar{y}$, and $\bar{z}$ are the basic data concerning the chromatic properties of the human eye such as those published by the International Commission on Illumination.

Another means and method for achieving theoretically correct color reproduction similar to that described above, utilizes only three color separation positives, one for each color channel. The three color separation positives are made through suitable filters such that the spectral sensitivity of the three receptors corresponds to three imaginary primaries not obtainable in reality. Since three imaginary primaries are used, no negative values of the spectral sensitivity versus wave length curve for each receptor are needed. The three imaginary primaries used in calculating the desired spectral sensitivity versus wave length of the three receptors might, for example, be the three imaginary primary colors standardized by the International Commission on Illumination (see page 7 of Hardy's "Handbook of Colorimetry"), or various other imaginary primaries might be used. The three signals in the three color channels corresponding to the three imaginary primaries are color transformed by color transformer means to three new electric signals corresponding to three real, primary colors. This transformation is according to the following linear transformation equations:

$$r' = k_1 r + k_2 g + k_3 b$$
$$g' = k_4 r + k_5 g + k_6 b$$
$$b' = k_7 r + k_8 g + k_9 b$$

where $r$, $g$ and $b$ are the tristimulus values of the original imaginary primaries and $r'$, $g'$ and $b'$ are the tristimulus values of the new set of real primaries, and $k_1$ to $k_9$ are the tristimulus values of the original primaries on the basis of new primaries. (See page 7, Hardy's "Handbook of Colorimetry.")

This continuation in part also contemplates the use of alternate apparatus and methods for converting three color input signals into four output channels including three color channels and a black channel.

At any given instant not more than two of the color output channels are effective and the black channel is also effective, since a mixer similarly multiplies the three color input signals so as to cause the color output signal corresponding to the least colored ink coverage to be maintained at a preselected, fixed value, corresponding to no colored ink coverage for that channel. The black or achromatic channel has an output signal which is a function of the multiplication necessary to change said minimum output channel to a value corresponding to no ink coverage for that channel.

It can readily be seen that this modifying or mixing effect is in actuality an equal multiplying or dividing action of all of the color outputs. Mathematically, adding or subtracting the logarithm of a first quantity to or from the logarithm of a second quantity and then taking the antilogarithm thereof, corresponds to directly multiplying or dividing the second quantity by the first quantity. It is possible to use a system where logarithms are taken of the three color signals and the three logarithmic color signals added to or subtracted from so as to cause one of said logarithmic signals corresponding to the least ink to be maintained at a fixed, preselected value corresponding to no colored ink coverage for that channel, and then taking the antilogarithm of the three modified logarithmic color channels as the three final color outputs. The antilogarithm of the quantity added to or subtracted from the three color signals may be used as the final black output, the four outputs being adapted to control four linear light valves for making three corrected color separation photographic images and a fourth black or achromatic corrected separation photographic image or the four logarithmic output signals may go directly to a reproducing head means for directly applying the various inks for making a colored pictorial representation.

In a similar manner the three color signals may be multiplied or divided directly so as to maintain the color signal corresponding at a given instant to the least colored ink coverage, at a preselected, fixed value corresponding to no colored ink coverage for that channel. Said multiplying factor used in equally multiplying the three color signals may then be used for creating the black or achromatic output signal.

The four separation photographic images may be made with four linear light valves controlled by the four output signals in the manner hereinafter described or the logarithms of the signals may be taken for controlling a reproducing head for making colored pictorial representations by the direct application of ink as hereinbefore described.

The reason for converting three color input channels into three color output channels and a black output channel is as follows:

It has been found by the printing trade that while theoretically perfect color reproduction may be achieved by the use of various colored inks alone, in practice this is not satisfactory. Muddy looking pictures lacking in contrast and definition result from such a three-color process.

In such a three-color process shades of black or gray are formed by combining the various colored inks in virtually equal proportions. This does not produce a clear, sharply outlined, definitive black. It is, therefore, desirable that the varying density and all shades of black and gray of a color reproduction be achieved by use of a black ink.

A black ink may be considered to be composed of or equivalent to a combination of equal percent coverages of each of three theoretically perfect colored inks. Such theoretically perfect colored inks may be defined as a set of colored inks each of which absorbs light completely in one and only one of the color bands, red, green and blue. These color absorption bands may not overlap nor may there be gaps between them in the absorption curve. Such inks are not available. It is therefore theoretically possible and from the standpoint of making color corrections highly desirable to use an amount of black ink sufficient to reduce the coverage of the colored ink corresponding to the least coverage to zero or essentially zero. In other words, at any one point the ink coverage should consists entirely of a black ink and two colored inks, the black ink coverage being just sufficient to have reduced the least colored ink coverage to zero and to correspondingly reduce the other two colored inks.

It has been found experimentally and it can be shown to have a sound theoretical basis that the effect of varying the percent coverage of the black ink is to multiply the light reflected at any wave length by the same factor. This is true no matter what combination of printing inks have been previously used in printing the paper. A discrepancy to this rule is found when the percent coverage of the black ink approaches 100 because of the small percentage of white light reflected from the surface of the black ink. The effect of the black ink is equivalent to that of a shutter on the light source for the spot in question. Therefore, it is necessary that means be provided for modifying the three color inputs into three color outputs and a black output in a manner which multiplies or divides all of the color channel outputs by the same factor so as to cause the color output instantaneously corresponding to the least colored ink coverage to be maintained at the preselected fixed value corresponding to no colored ink coverage. The amount of said multiplication needed determines the black output. In the forms of this invention adapted to directly controlling the application of ink to a suitable medium through a reproducing head or the like, the situation is mathematically the same except that the three color channel outputs and the black output must be in the logarithmic form when applied to said reproducing head if the correct color reproduction is to be obtained and the black output is equal to an amount which has been effectively added to or subtracted from the color signals so as to cause the color output signal, corresponding to the least colored ink coverage, to be virtually maintained at a value corresponding to no colored ink coverage.

In a color reproduction process two colored inks are printed upon the same surface, the amount of light reflected by the paper and passing through one colored ink will be modified by the amount of another colored ink superimposed thereon. This is caused by reason of the fact that no really pure colored inks may be obtained. All colored inks obtainable have overlapping color absorption characteristics. In other words, they both absorb light in a certain spectral region common to both; thus, for example, if a certain amount of yellow (or blue absorbing) ink is printed upon a suitable surface and then a certain amount of magenta ink is superimposed thereon, the amount of light reflected from the paper in the blue spectral region will be much less than normally would occur with the same yellow ink coverage and no magenta ink superimposed thereon. It may be shown that in a halftone printing process wherein dots placed at various angles print the various colored inks, the amount of two colored inks which will be superimposed is a function of the percentage of coverage of one ink multiplied by the percentage of coverage of the other ink.

In the forms of my invention adapted to reproduce a colored pictorial representation or facsimile by means of the hereinbefore mentioned reproducing means adapted to atomize, mix and spray the various inks directly upon a suitable medium such as paper or the like, the various colored inks are atomized and mixed in the air stream which deposits them upon the paper. Therefore, the modification of the amount of light reflected from the paper in a spectral region corresponding to a given colored printing ink when combined with a certain amount of a second given colored printing ink is a function of the amount of the two inks used, different from the similar function in the above mentioned halftone printing process.

In the above described systems wherein three color inputs are modified so as to have four output channels, including three color output channels and a black or achromatic output channel, an additional color correcting step may be used for further modifying the signals in the various color channels according to the combinations of the various colored inks which will be printed so as to virtually compensate for the above mentioned overlapping color absorption characteristics of superimposed or mixed colored inks.

The electrical transmission and reproduction of pictorial matter in natural colors has not been satisfactorily achieved heretofore, but is readily and accurately accomplished by means of the present invention.

The methods and devices of the present invention may be used in the reproduction of colored facsimiles, either from lithographic colored pictorial representations, color separation photo images or an original colored subject. It is to be understood that the forms of the invention which include the step of taking the logarithm of the three color input signals are capable of reproducing colored prints either from negatives or positives and are capable of reproducing correct color separation photographic images, which may be either positive or negative, from either negatives or positives.

An object of the present invention, therefore, is to disclose and provide method and means for scanning a plurality of color separation images cooperating with three color input channels and translating signals in said three color input channels into two instantaneously effective color signals in three color output channels and a black output signal in a black channel, the output signals being adapted to control light valve means for making four color separation photographic images adapted for use in making color printing plates or the like.

A further object of the present invention, is to disclose and provide method and means for scanning a plurality of color separation images associated with three color input channels and translating signals in said three color input channels into two or less instantaneously effective color signals in three color output channels and a fourth black output signal in a black channel; correcting the signals in the color output channels to compensate for the overlapping color absorption characteristics of superimposed colored printing inks and utilizing the outputs for controlling light valves for making four photographic color separation images for use in making three color printing plates and a black printing plate.

It is a further object of this invention to disclose and provide methods and means for scanning an original colored subject, color transparencies, pictorial representation or color separation photographic images and to translate the instantaneous signals in color input channels into instantaneous signals in a lesser number of color output channels plus a black output signal in a black output channel and correcting the signals in the color output channels so as to compensate for overlapping color absorption characteristics of mixed colored inks to be used in reproducing a facsimile of the original subject.

An object of the present invention, therefore, is to disclose and provide method and means for scanning a plurality of color separation images cooperating with three color input channels and translating signals in said three color input channels into two or less instantaneously effective color signals in three color output channels and a black output signal in a black channel, the output signals being adapted to control reproducing head means for applying inks upon a suitable medium such as paper or the like, to make a colored pictorial representation or facsimile.

A further object of the present invention is to disclose and provide method and means for scanning a plurality of color separation images associated with three color input channels and transforming signals in said three color input channels into two or less instantaneously effective color signals in three color output channels and a fourth black signal in a black output channel; correcting the signals in the color output channels to compensate for the overlapping color absorption characteristics of mixed colored printing inks and utilizing the outputs for controlling reproducing head means for atomizing and spraying colored inks and black ink upon a suitable medium such as paper or the like, to make a colored pictorial representation or facsimile.

Another object of the present invention is to disclose and provide method and means whereby automatic compensation or correction may be obtained for overlapping color absorption characteristics of superimposed or mixed inks employed in making colored reproductions.

Another object of the present invention is to disclose and provide method and means whereby a plurality of color input signals are converted into a similar number of output signals including a plurality of color output signals and a correlated black output signal.

A further object of the present invention is to disclose improved methods and apparatus of the transmission and reproduction of pictorial representations in color and for the making of color printing plates.

It is a further object of this invention to provide method and means for transforming signals corresponding to imaginary primary colors into signals corresponding to real primary colors.

In general, it is an object of the present invention to disclose and provide an integrated method and apparatus for successfully making color separation photographic images adapted for use in making true color reproductions or facsimilies of an original colored subject, photograph, transparency, separation images of the like, or for directly making true color reproductions or facsimilies of an original colored subject, photograph, transparency, separation images, or the like.

These and other subjects, uses, modifications and adaptations of the present invention will become apparent to those skilled in the art from the following detailed description of certain exemplary forms of the present invention, it being understood that the invention is not limited to the specific arrangements hereinafter described and shown in the appended drawings, since numerous variations and modifications may be made (as indicated in part hereinafter) without departing from the spirit and scope of the present invention.

In order to facilitate understanding, reference will be had to the appended drawings illustrative of certain arrangements, circuits, means and modes of operation embraced by this invention and in such drawings:

Fig. 1 is a first diagrammatic representation of various elements employed in making three correct color separation photographic images and a black separation photographic image adapted for use in making four color printing plates such as halftone printing plates or the like.

Fig. 3 is a third diagrammatic representation of various elements employed in making three correct color separation negatives and a black separation negative which may be used for making four printing plates.

Fig. 4 is a wiring diagram schematically illustrating the additive or subtractive mixer of my invention.

Fig. 6 is a wiring diagram schematically illustrating the multiplying mixer of my invention.

Fig. 7 is a wiring diagram schematically illustrating the color transformer of my invention.

Figure 1:
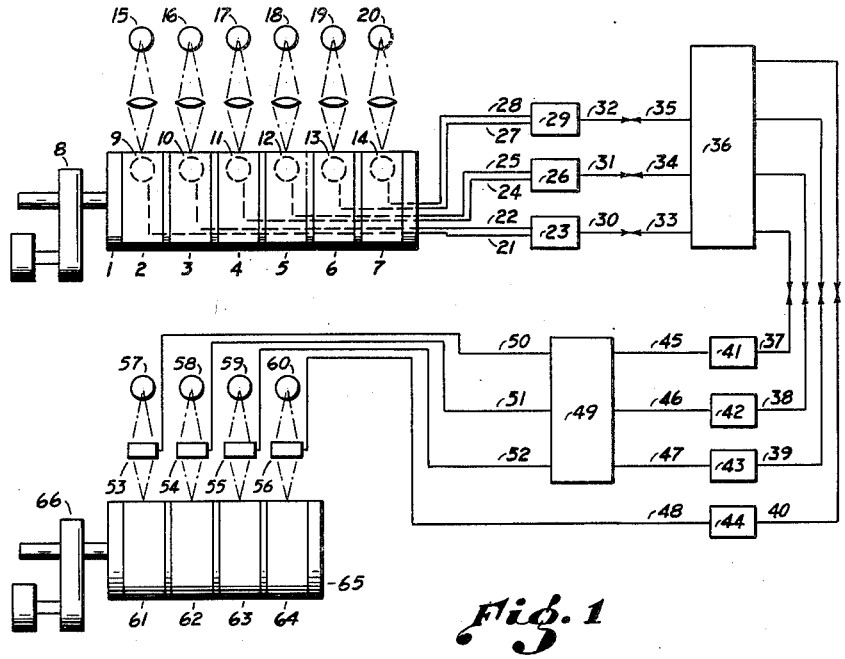

A general arrangement of the various elements included in one integrated, complete system for making from three pairs of color separation positives, three corrected color separation negatives and a fourth corrected black negative for use in making three halftone color printing plates and a fourth halftone black printing plate adapted to print correspondingly colored inks and a black ink for making true color reproductions or facsimiles of a colored subject is diagrammatically illustrated in Fig. 1. As there shown, the scanning drum, generally indicated at 1, carrying six color separation positives 2, 3, 4, 5, 6, and 7 is rotated and axially moved by a suitable drive indicated generally at 8. Details of construction of the scanning drum and driving means need not be illustrated, since such means are available and are well known in the art.

Positioned within the scanning drum 1 are photoelectric cells 9, 10, 11, 12, 13 and 14 adapted to receive light from sources 15, 16, 17, 18, 19 and 20, respectively. The light sources 15 to 20 may be separate light sources or they may be a single light source with means for dividing the light equally between the photoelectric cells 9 to 14. The photoelectric cells 9 and 10 are connected as by lines 21 and 22 with a differential logarithmic amplifier indicated generally at 23. The photoelectric cells 11 and 12 are connected as by lines 24 and 25 to a second differential logarithmic amplifier indicated generally at 26. The photoelectric cells 13 and 14 are connected as by lines 27 and 28 to a third differential logarithmic amplifier indicated generally at 29. The lines 21 and 22, 24 and 25, and 26 and 27 constitute portions of three separate color channels, to which reference will be made hereafter.

The differential logarithmic amplifiers 23, 26 and 29 may be supplied with electric power from an electric power supply not shown. Each differential logarithmic amplifier in connection with its two associated scanning photocells constitutes a scanning means for one color channel. The preferred form of the scanning photoelectric cells 9 to 14 in the example shown is an electron multiplier, photo tube of an electrostatically focused, multi-electrode type, the multiple electrodes being connected to various points of a tapped resistance or voltage divider.

The three scanning means utilized and differential logarithmic amplifiers utilized herein are of the type illustrated, described and claimed in my copending application, Serial No. 702,172 filed October 9, 1946, now Patent No. 2,454,871, granted November 30, 1948, which is also a continuation-in-part of the before mentioned parent application, Serial No. 426,220, filed January 9, 1942, now Patent No. 2,413,706, of which this application is also a continuation-in-part.

It is sufficient to note here that the scanning means are designed to assure that the output from each scanning means is a logarithmic function of the difference between the values of the light received by the two photo cells of each channel being scanned. This is accomplished in an inverse feedback manner by feeding back an anode signal from each differential logarithmic amplifier to a tapped resistor across the multiple electrodes of the two electron multiplier photo tubes of each channel for varying the amplification of the photo tubes so as to maintain a virtually constant differential anode output from the two photo tubes of each channel. The amount of signal fed back from each logarithmic amplifier necessary to virtually maintain the differential anode output of the two photo tubes of that color channel at a preselected, fixed value is a virtually logarithmic function of the differential output of the two photo cells of each color channel because of the characteristics of the multiple electrode, electrostatically focused, electron multiplier photo tubes used.

The output leads of the differential logarithmic amplifiers 23, 26 and 29 are indicated at 30, 31 and 32 respectively. These output leads may be directly connected to the input leads 33, 34 and 35 of an additive and subtractive mixer indicated generally at 36. The additive and subtractive mixer 36 may be supplied with electric power from a suitable electric power supply not shown. In the event it is desired to transmit the outputs so as to cause reproduction to take place at a distant point, the outputs 30, 31 and 32 of the differential logarithmic amplifiers 23, 26 and 29 may be connected to one or a plurality of transmitters of any of the types well known in the art. It is to be understood that in the event a single transmitter is employed, separate channels or carrier waves may be used for transmitting each of the color channels. Such transmitters are not shown in Fig. 1, since they are available and well known in the art. Separate receivers may be associated with the input leads 33, 34 and 35 of the mixer 36 for receiving the signals transmitted by the three transmitters. Such receivers are not shown since they are available and well known in the art.

The mixer 36 is connected to four leads 37, 38, 39 and 40. The leads 37, 38 and 39 constitute the three color channels whereas lead 40 may be said to represent the black lead from the mixer. The mixer involves means whereby the magnitude of the black output is controlled in accordance with a modifying factor which similarly modifies the output of the three color channels so as to cause the instantaneously minimum color channel output to be maintained at a value virtually corresponding to no colored ink coverage for that channel. Details of the preferred form of mixer are illustrated in Fig. 4 and will be described hereinafter.

The leads 37, 38, 39 and 40 from the mixer 36 may then be sent through suitable antilogarithmic amplifiers indicated generally at 41, 42, 43 and 44. The four antilogarithmic amplifiers 41 to 44 may be supplied with electric power from a suitable electric power supply not shown. The four antilogarithmic amplifiers 41 to 44 act to take the antilogarithm of the input signal received by said antilogarithmic amplifiers. The antilogarithmic amplifiers 41 to 44 are provided with output leads 45, 46, 47 and 48 adapted to carry said antilogarithmic signals. The antilogarithmic amplifiers utilized herein are of the type illustrated, described and claimed in my copending application Serial No. 702,172, filed October 9, 1946, which is a continuation-in-part of the before mentioned parent application. It is sufficient to note here that the antilogarithmic amplifiers are designed to assure that the output signals from said amplifiers are virtually antilogarithmic with respect to the input signals to said amplifiers.

Figure 5:
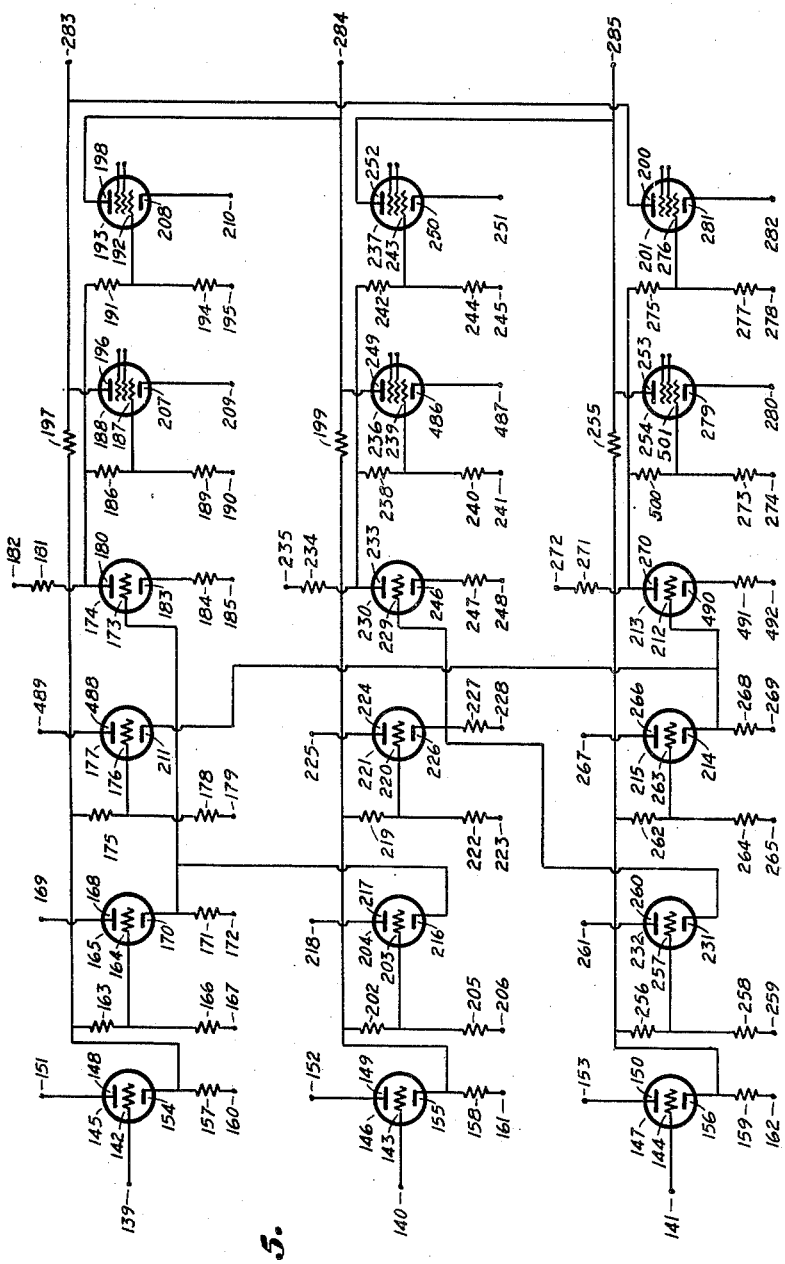
Fig. 5 is a wiring diagram schematically illustrating the ink color absorption corrector of my invention.

The antilogarithmic signals carried by the output leads 45, 46 and 47 of the antilogarithmic amplifiers 41, 42 and 43, which constitute portions of the three color channels, are connected to ink color absorption corrector, indicated generally at 49. The ink color absorption corrector 49 may be supplied with electric power from a suitable electric power supply not shown. The color absorption corrector 49 acts to modify the signals in the three color channels in accordance with the combinations of colored inks, the percentage of coverage of the various colored inks and the color absorption characteristics of the inks which are to be printed simultaneously so as to be superimposed or mixed. Details of the preferred form of ink color absorption corrector are illustrated in Fig. 5 and will be described hereinafter.

The ink color absorption corrector 49 is provided with output leads 50, 51 and 52 which constitute portions of the three color channels and which are connected to linear light valves indicated generally at 53, 54 and 55. The output lead 48 of the antilogarithmic amplifier 44 constitutes a portion of the black channel and is connected to a black linear light valve indicated generally at 56. The three color channel light valves 53, 54 and 55 and the black channel light valve 56 vary the light coming from light sources 57, 58, 59 and 60 which is focused upon four photographic films or the like, 61, 62, 63 and 64 which are mounted upon a drum indicated generally at 65 which is rotated and axially moved by a suitable drive indicated generally at 66, for making three corrected color separation negatives 61, 62 and 63 and a fourth corrected black separation negative 64.

The general arrangement diagrammatically illustrated in Fig. 1 will be described hereinafter in detail for the purpose of describing the construction of the various elements embraced in the system, the system being particularly adapted for making four color separation negatives from six color separation positives as illustrated. It is to be understood, however, that by minor changes and modifications which will be obvious to those skilled in the art from the subsequent detailed description, this invention may be employed in the production of more or less than three color separation images which may or may not include a black separation image and which may be positive and negative and which may be made from more or less than six color separation images which may be positives or negatives, and which may reflect or transmit light, and which may be made from the original or from a single colored transparency, image or the like, which may transmit or reflect light. The light may be passed through a beam splitter or colored filters so as to separate the colored light into suitable bands of frequencies, each band then affecting a separate scanning cell or a portion of the light from a colored print may be sent through a suitable filter to separate scanning cells. Details of these modifications need not be described, since they have been previously shown in general forms in various prior patents, such as Patent No. 1,709,926 and Patent No. 1,814,987.

As before mentioned, of the elements shown in Fig. 1, the scanning means, differential logarithmic amplifiers and the antilogarithmic amplifiers are of the type illustrated, described and claimed in my copending application, Serial No. 702,172, which is a continuation-in-part of the before mentioned parent application, Serial No. 426,220, filed January 9, 1942, now Patent No. 2,413,706, of which this application is also a continuation-in-part, and will not be described specifically herein. The rest of the elements in the system will be described specifically in detail hereinafter.

*Additive and subtractive mixer*

An electrical schematic wiring diagram of the additive and subtractive mixer of this invention is shown in Fig. 4. The input terminals 67, 68 and 69 are connected to the leads 33, 34 and 35 of Fig. 1, which in turn are connected to output leads 30, 31 and 32 coming from the differential logarithmic amplifiers 23, 26 and 29. The input terminals of the mixer 67, 68 and 69 are connected to the grids 70, 71 and 72 of input electron tubes 73, 74 and 75, respectively. The anodes 76, 77 and 78 of the tubes 73, 74 and 75, respectively, are connected through suitable plate resistances 79, 80 and 81 to positive power input terminals 82, 83 and 84. The anode 76 of the input tube 73 in the first color channel is connected through resistance 85 shunted by a condenser 86 to the grid 87 of a selector electron tube 88. The grid 87 is also connected through a resistor 89 to negative power input terminal 90. The anode 91 of the selector tube 88 is connected through a plate resistance 92 to a positive power input terminal 93. The anode 91 of the selector tube 88 is also connected through a resistance 94 shunted by a condenser 95 to a grid 96 of an electron tube 97. The grid 96 is also connected through a resistor 98 to negative power input terminal 99. The cathode 100 of the selector electron tube 88 is connected to negative power input terminal 101. The anode 102 of the electron tube 97 is connected to positive power input terminal 103. The cathode 104 of the input electron tube 73 in the first color channel and the cathode 105 of the input electron tube 74 in the second color channel and the cathode 106 of the input electron tube 75 in the third color channel and the cathode 107 of an electron tube 108 in the black channel and the cathode 109 of the electron tube 97 are all connected in parallel and are connected through a resistor 110 to a negative power input terminal 111. The anode 77 of the input electron tube 74 in the second color channel is connected through a plate resistor 80 to positive power input terminal 83. The anode 77 is also connected through a resistor 112 shunted by a condenser 113 to the grid 114 of a selector electron tube 115. The grid 114 is also connected through a resistor 116 to a negative power input terminal 117. The anode 118 of the selector electron tube 115 in the second color channel is connected in parallel with the anode 91 of the selector electron tube 88 in the first color channel and is connected through the plate resistor 92 to positive power input terminal 93. The cathode of the selector electron tube 115 in the second color channel is connected to negative power input terminal 119. The anode 78 of the input electron tube 75 in the third color channel is connected through plate resistor 81 to positive power input terminal 84. The anode 78 of the electron tube 75 is also connected through a resistor 120 shunted by a condenser 121 to the grid 122 of a selector electron tube 123. The grid 122 is also connected through a resistor 124 to negative power input terminal 125. The anode 126 of the selector electron tube 123 in the third color channel is connected in parallel with the anode 118 of the selector electron tube 115 in the second color channel and the anode 91 of the selector electron tube 88 in the first color channel and is connected through plate resistor 92 to positive power input terminal 93. The cathode 127 of the selector electron tube 123 is connected to negative power input terminal 128. The anode 129 of the black output electron tube 108 is connected through a plate resistor 130 to positive power input terminal 131. The grid 132 of the electron tube 108 is connected to a grid biasing potentiometer and power supply indicated generally at 133 which is also connected to a negative terminal 134.

The anodes 76, 77 and 78, respectively of the three color channel input tubes are connected to corresponding color output terminals 135, 136 and 137. The anode 129 of the black output electron tube 108 is connected to black output terminal 138.

The operation of the device may be described as follows: Tubes 88, 115 and 123 are selector tubes which act as rectifier tubes in that the tubes with the most negative grids have no plate current and are therefore inoperative, the selector tube having the most positive grid controls the grid voltage of the tube 97 which in turn controls the cathode voltages of the tubes 73, 74, 75 and 108.

In actual operation the system works in an inverse feedback manner as follows: Assume that the grid 87 of selector tube 88 in the first color channel is the most positive of the three grids 87, 114 and 122 of the three selector tubes 88, 115 and 123 of the three color channels. Therefore, the tube 88 in the first color channel is the only selector tube in operation. If the grid 70 of the input tube 73 of the first color channel is made more negative, the anode 76 of the tube 73 and the grid 87 of the selector tube 88 are made more positive. The anode 91 of the tube 88, the grid 96 of the tube 97 and the cathodes 109, 107, 106, 105 and 104 of the electron tubes 97, 108, 75, 74 and 73, respectively, are all made more negative. In this way the cathode 104 of the input tube 73 of the first color channel changes in potential almost as much as the original potential change of the grid 70. The anode voltage of the tube 73 is at the same time regulated to a practically constant voltage. This voltage is made to correspond to zero percent coverage of the corresponding colored ink for that color channel, and the potential of the output signal at terminal 135 is such as to result in zero percent coverage of the corresponding colored ink for that channel.

The function of the mixer is to add or subtract a voltage to all three input signals from the differential logarithmic amplifiers so that the signal corresponding to the most light and the least colored ink is regulated to constant value. This signal corresponds to the most positive anode and the most negative grid of the input tubes 73, 74 and 75. Thus, it can be seen that the voltages at the output terminals 135, 136, 137 and 138 correspond to the theoretically correct output voltages if correct color reproduction is to be obtained as outlined hereinbefore.

Color output terminals 135, 136 and 137 and the black output terminal 138 of the mixer indicated generally at 36 in Fig. 1 are connected, respectively, to leads 37, 38, 39 and 40 which are connected to the input terminals of four antilogarithmic amplifiers indicated generally at 41, 42, 43 and 44 in the Fig. 1. These antilogarithmic amplifiers are not described in detail since they are illustrated, described and claimed in my copending application, Serial No. 702,172, filed October 9, 1946. Suffice it to say that said antilogarithmic amplifiers are adapted to convert four input signals into four output signals virtually antilogarithmic with respect to the four input signals.

The black output lead 48 from the black antilogarithmic 44 is connected to a linear light valve indicated generally at 56 or black antilogarithmic amplifier 44 may be used directly as an antilogarithmic nonlinear light valve in a manner fully illustrated, described and claimed in my copending application, Serial No. 702,172.

*Superimposed ink color absorption corrector*

The three color output leads 45, 46 and 47 from the three color antilogarithmic amplifiers 41, 42 and 43, shown in Fig. 1, are connected to input terminals 139, 140 and 141 of a superimposed ink color absorption corrector indicated generally at 49 in Fig. 1 and more specifically in electrical schematic form in Fig. 5.

Referring to Fig. 5, the color channel input terminals 139, 140 and 141 are connected to grids 142, 143 and 144 of cathode follower electron tubes 145, 146 and 147, respectively. The anodes 148, 149 and 150 of cathode follower tubes 145, 146 and 147 are connected to positive power input terminals 151, 152 and 153 respectively. The cathodes 154, 155 and 156 of the cathode follower tubes 145, 146 and 147, respectively, are connected through cathode resistors 157, 158 and 159 to negative power input terminals 160, 161 and 162, respectively. The cathode 154 of the cathode follower tube 145 in the first color channel is connected through a resistor 163 to the grid 164 of a selector electron tube 165. The grid 164 is also connected through a resistor 166 to negative power input terminal 167. The anode 168 of the selector tube 165 is connected to positive power input terminal 169. The cathode 170 of the selector tube 165 is connected through a cathode resistor 171 to negative power input terminal 172. The cathode 170 of the selector tube 165 in the first color channel is also connected to the grid 173 of a phase inverter tube 174 in the first color channel and to the cathode 216 of selector electron tube 204 in the second color channel. The cathode 154 of the cathode follower tube 145 is also connected through a resistor 175 to the grid 176 of a second selector tube 177. The grid 176 is also connected through a resistor 178 to negative power input terminal 179. This grid biasing network comprising the resistors 175 and 178 is connected to the cathode 154 of the cathode follower tube 145 in parallel to the grid biasing resistors 163 and 166. The anode 488 of the second selector tube 177 is connected to positive power input terminal 489.

The anode 180 of the phase inverter tube 174 is connected through a plate resistor 181 to positive power input terminal 182. The cathode 183 of phase inverter tube 174 is connected through a cathode resistor 184 to negative power input terminal 185. The anode 180 of the phase inverter tube 174 is also connected through a resistance 186 to the control grid 187 of an electron tube 188. The grid 187 is also connected through a resistor 189 to a negative power input terminal 190. The anode 180 is also connected through a resistor 191 to the control grid 192 of an electron tube 193. The control grid 192 is also connected through a resistor 194 to negative power input terminal 195. The anode 196 of the electron tube 188 is connected through a resistor 197 to the cathode 154 of the input cathode follower tube 145 and is also connected to the anode 200 of an electron tube 201 in the third or lower color channel as viewed in Fig. 5. The anode 198 of the electron tube 193 is connected through a resistor 199 to the cathode 155 of the input cathode follower tube 146 in the middle channel as viewed in Fig. 5 and through a resistor 202 to the grid 203 of the first selector tube 204 of the second color channel, the grid 203 being also connected through a resistor 205 to negative power input terminal 206.

The cathodes 207 and 208 of the two electron tubes 188 and 193 are connected to negative power input terminals 209 and 210, respectively. The cathode 211 of the second selector tube 177 in the first or top color channel is connected to the grid 212 of the phase inverter tube 213 in the third bottom color channel as viewed in Fig. 5 and is also connected in parallel with the cathode 214 of the second selector tube 215 in said third or bottom color channel as viewed in Fig. 5, and is also connected through cathode resistor 268 to negative power input terminal 209

Referring to the middle color channel, the cathode 155 of input cathode follower tube 146 is connected through the resistance 202 to a grid 203 of a selector tube 204. The grid 203 is also connected through a resistor 205 to a negative power input terminal 206.

The cathode 216 of the first selector tube 204 is connected in parallel with the cathode 170 of the first selector tube 165 in the first or top color channel as viewed in Fig. 5 and is also connected through the cathode resistor 171 to negative power input terminal 172 and also to the grid 173 of the phase inverter tube 174 in the top color channel. The anode 217 of the first selector tube 204 of the middle color channel is connected to positive power input terminal 218. The cathode 155 of the cathode follower tube 146 of the middle color channel is also connected through a resistor 219 to the grid 220 of a second selector tube 221 of the middle color channel. The grid 220 is also connected through a resistor 222 to negative power input terminal 223. The grid biasing resistors 219 and 222 are connected to the cathode 155 of the follower 146, in parallel to grid biasing resistors 202 and 205. The anode 224 of second selector tube 221 is connected to positive power input terminal 225. The cathode 226 of the second selector tube 221 is connected through a cathode resistance 227 to a negative power input terminal 228. The control grid 229 of phase inverter tube 230 is connected to the cathode 226 of the second selector tube 221 in the middle color channel and also connected to the cathode 231 of the first selector tube 232 in the third or bottom color channel as viewed in Fig. 5. The anode 233 of the phase inverter tube 230 is connected through a plate resistor 234 to positive power input terminal 235. The anode 233 of the phase inverter tube 230 is also connected in parallel to the grid biasing circuits of two electron tubes 236 and 237. The anode 233 is connected through a resistor 238 to the control grid 239 of the electron tube 236. The grid 239 is also connected through a resistor 240 to negative power input terminal 241. The anode 233 is also connected in parallel to the first mentioned grid biasing circuit through a resistor 242 to the control grid 243 of the electron tube 237. The control grid 243 is also connected through a resistor 244 to negative power input terminal 245. The cathode 246 of the phase inverter tube 230 is connected through a cathode resistor 247 to a negative power input terminal 248. The anode 249 of the electron tube 236 is connected in parallel with the anode 198 of the electron tube 193 in the first color channel through the resistor 199 to the cathode 155 of the cathode follower tube 146 of the middle color channel and through cathode resistor 153 to negative power input terminal 161 and the grid biasing network of tubes 204 and 221. The cathode 486 of the electron tube 236 is connected to negative power input terminal 487. The cathode 250 of the electron tube 237 is connected to negative power input terminal 251. The anode 252 of the electron tube 237 is connected in parallel to the anode 253 of an electron tube 254 in the third or bottom color channel as viewed in Fig. 5 and through a resistor 255 to the cathode 156 of the cathode follower tube 147 in the third color channel and the grid biasing network of tubes 215 and 232 and negative power input terminals 162, 259 and 265.

Referring to the third or bottom color channel as viewed in Fig. 5, the cathode 156 of the input cathode follower tube 147 is connected through a resistor 256 to the grid 257 of a first selector tube 232. The grid 257 is also connected through a resistor 258 to negative power input terminal 259. The anode 260 of the first selector tube 232 is connected to positive power input terminal 261. The cathode 156 of the input cathode follower tube 147 is also connected in parallel to the grid biasing circuit comprising resistors 256 and 258, through a resistor 262 to the grid 263 of the second selector tube 215. The control grid 263 is also connected through a resistor 264 to a negative power input terminal 265. The anode 266 of the second selector tube 215 is connected to positive power input terminal 267. The cathode 214 of the second selector 215 is connected through a cathode resistor 268 to a negative power input terminal 269. The anode 270 of the phase inverter tube 213 is connected through a plate resistor 271 to a positive power input terminal 272. The anode 270 is also connected in parallel to the grid biasing circuits of two electron tubes 254 and 201, said anode 270 being connected through a resistor 500 to the control grid 501 of the electron tube 254. The control grid 501 is also connected through a resistor 273 to a negative power input terminal 274. The anode 270 being also connected in parallel through a resistor 275 to the control grid 276 of the pentode electron tube 201; the control grid 276 being connected through a resistor 277 to a negative power terminal 278. The cathode 490 of the phase inverter tube 213 is connected through a cathode resistor 491 to negative power input terminal 492. The cathode 279 of the electron tube 254 is connected to a negative power input terminal 280. The cathode 281 of the electron tube 201 is connected to a negative input terminal 282. The anode 200 of the electron tube 201 in the third color channel is connected in parallel with the anode 196 of the electron tube 188 in the first color channel to a color output terminal 283 for the first color channel. The anode 198 of the electron tube 193 in the first color channel is connected in parallel with the anode 249 of the electron tube 236 in the second color channel to a color output terminal 284 for the second color channel. The anode 252 of the electron tube 237 in the second color channel is connected in parallel with the anode 253 of the electron tube 254 in the third color channel to a color output terminal 285 for the third color channel.

The operation of the color absorption corrector may be described as follows: Input tubes 145, 146 and 147 are cathode follower tubes which have output voltages virtually the same as the input voltages to their grids 142, 143 and 144, and which have low output resistances. In order to give a specific illustration of the process, assume that the tubes 145, 146 and 147 control the yellow, magenta and blue color channels, respectively. Tubes 165, 204, 232, 177, 221 and 215 are selector tubes each of which is provided at the input with a resistance network or "volume control" by means of which necessary adjustments can be made. The selector tubes are operated in pairs corresponding to a pair of colored inks. Tubes 165 and 204 are the selector tubes which are used when the yellow and magenta inks are used together. If yellow ink is first printed and magenta ink is then superimposed thereupon by the halftone printing process, the signal for the yellow is much less than its correct value and the signal for the magenta is slightly less than its correct value. This can be determined by calculating the color absorption characteristics of the two inks. Therefore, by the proper choice of resistances for the resistance networks at the inputs of tubes 165 and 204, conditions are fixed so that common cathode voltage of these two selector tubes 165 and 204 is regulated by the least value of the two signals. An increase in signal or percentage coverage of ink corresponds to the primary input voltage or potential becoming more negative so the least value of the two signals mentioned above, corresponds to the more positive signal. The cathode voltage of the cathodes 170 and 216 of the selector tubes 165 and 204 is used as the input to the phase inverter tube 174, the output of which is, in turn, connected to the inputs of tubes 188 and 193. Tube 188 is connected to the yellow channel, the output terminal of which is 283. Tube 188 causes a voltage drop in the resistor 197 which results in an increase in signal and percent coverage of the corresponding colored ink. Likewise, the tube 193 causes an increase in the magenta signal in order to give the correct value, although the required increase in signal is so small that it may be neglected and the tube 193 dispensed with.

It should be emphasized that these correction factors are not used except when the two inks, yellow and magenta, are used together, because the correction factors are proportional to the least value of the signal or percentage coverage for the two inks. The conditions for the other selector tubes and other combinations of colored inks are determined in a similar manner.

The three color output terminals 283, 284 and 285 are connected to leads 50, 51 and 52 as viewed in Fig. 1 and the black output from the antilogarithmic amplifier 44 is connected to output lead 48. The four output leads 50, 51, 52 and 48 are connected respectively to four linear light valves indicated generally at 53, 54, 55 and 56. These four light linear valves may be any type of linear light valve known in the art. For example, they may comprise mercury vapor rectifier tubes used as lamps. Preferably such mercury vapor rectifier tubes should have heated filaments but not necessarily so, in fact any type of light valves wherein the light output bears a linear relation to the electric input may be used. These four light valves are adapted to vary the intensity of light beams focused upon four photosensitive mediums located generally at 61, 62, 63 and 64, such as photographic film or the like mounted upon a drum indicated generally at 65 and adapted to be rotated and axially advanced by means of any suitable driving mechanism indicated generally at 66. As hereinbefore mentioned, the fourth or black antilogarithmic amplifier indicated generally at 44 may be utilized directly as an antilogarithmic nonlinear light valve in place of the linear light valve indicated generally at 56 for making the black separation photographic negative 64 if so desired. Such a nonlinear antilogarithmic light valve is illustrated, described and claimed in my copending application Serial No. 702,172.

It is to be understood that the three color channel leads 45, 46 and 47 coming from the antilogarithmic amplifiers 41, 42 and 43 may be respectively connected directly to the upper ends of the resistor 163 in the first color channel shown in Fig. 5, the upper end of the resistor 202 in the second color channel shown in Fig. 5, and the upper end of the resistor 256 in the third color channel shown in Fig. 5. In other words, the ink color corrector input terminals 139, 140 and 141 and the input cathode follower tubes 145, 146 and 147, may be dispensed with entirely, and, as hereinbefore explained, the input connected directly to the three leads shown connected to cathodes 154, 155 and 156 of the three cathode follower input tubes 145, 146 and 147 shown in Fig. 5.

It is to be understood that the system shown diagrammatically in Fig. 1 may be operated, if desired, without the color absorption corrector shown generally at 49.

The output of each of the three differential logarithmic amplifiers 23, 26 and 29 may be sent to a suitable transmitter (in the event the photographic separation images are to be made at a considerable distance from the place of origin). Suitable receiver means may be connected to the input leads of the additive or subtractive mixer 36 for receiving the transmitted color channel signals if so desired.

Figure 11:
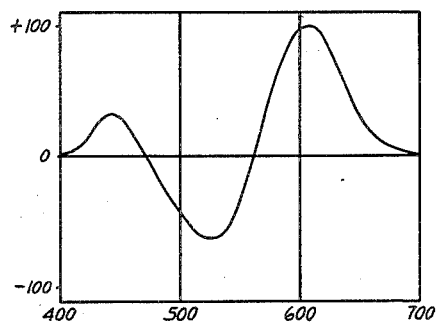
Fig. 11 is a graph of a theoretically correct spectral sensitivity-versus-wave length curve of a receptor corresponding to one color channel and having both positive and negative values as is required for correct color reproduction and determined by the colored inks to be used in color reproduction.
Figure 12:
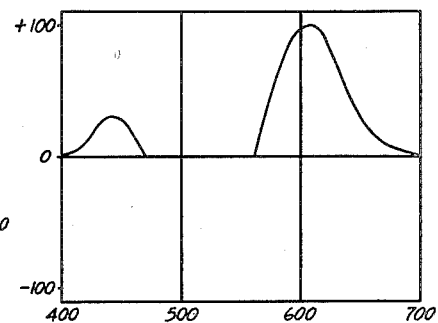
Fig. 12 is a graph of a practical receptor which may readily be achieved in practice and which has positive values in a given spectral region.
Figure 13:
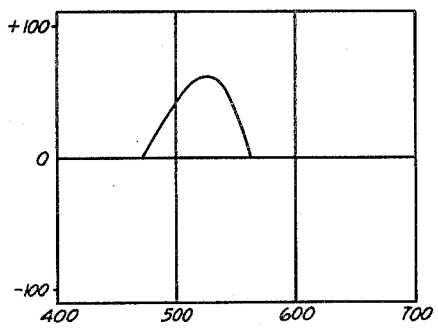
Fig. 13 is a graph of spectral sensitivity-versus-wave length curve of a practical receptor having positive values in a spectral region different from the receptor shown in Fig. 2 and which also may readily be achieved in practice.

It is understood, of course, that the system shown diagrammatically in Fig. 1, is of the type referred to hereinabove wherein each color channel is provided with two receptors, the spectral sensitivity-versus-wave length response of one photographic receptor being subtracted electrically, photographically or otherwise from the spectral response of the other photographic receptor, thus, making a combined receptor for each color channel having a spectral response positive in certain spectral regions and negative in other spectral regions; said combined spectral response or sensitivity being determined by the three colored inks to be used in reproduction. This is illustrated in Figs. 11, 12 and 13, where the curve shown in Fig. 11 is the desired combined spectral response, and the curves shown in Figs. 12 and 13 are curves obtainable with practical receptors which when combined by subtracting the curve shown in Fig. 13 from the curve shown in Fig. 12 virtually equal the desired curve shown in Fig. 11.

Figure 2:
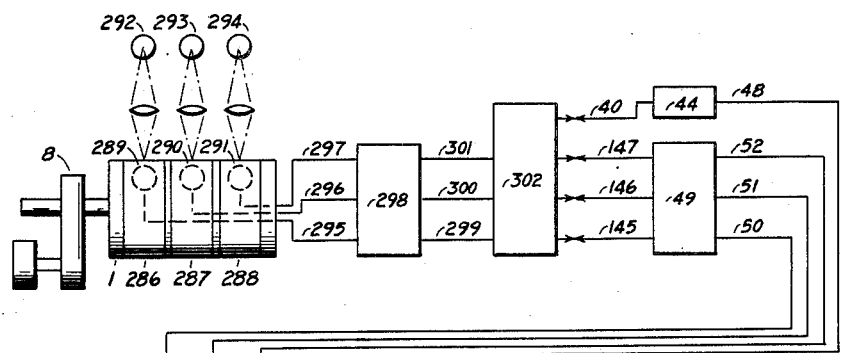
Fig. 2 is a second diagrammatic representation of various elements employed in making three correct color separation negatives and a black separation negative adapted for use in making four printing plates.

A second diagrammatic representation of various elements combined into a system for making three correct color separation negatives and a black separation negative from three color separation positives is shown in Fig. 2. Generally speaking, the system shown diagrammatically in Fig. 2 comprises a scanning drum indicated generally at 1 upon which are mounted three color separation photographic positives 286, 287 and 288. The drum 1 is adapted to be rotated and axially advanced by suitable driving mechanism indicated generally at 8. Details of construction of the scanning drum and driving means need not be illustrated since such means are available and known in the art. Positioned within the scanning drum are photoelectric cells 289, 290 and 291 adapted to receive light from sources 292, 293 and 294, respectively.

The photoelectric cells 289, 290 and 291 are connected as by lines 295, 296 and 297, respectively, with a color transformer indicated generally at 298. Leads 295, 296 and 297 constitute portions of three separate imaginary primary color channels to which reference will be made hereinafter.

It should be noted at this point that the three photographic color separation positives 286, 287 and 288 have been made through suitable filters such that the spectral response of each receptor comprising the photographic positive, the filter through which the image has been made, and the photoelectric cell which scans the positive, is such that the output of each imaginary primary color channel delivered to the color transformer through leads 295, 296 and 297 is related to the light originally emitted, reflected or transmitted by the colored subject so as to virtually correspond to a select spectral sensitivity versus wave length curve corresponding to imaginary primary reproducing colors.

Figure 9:
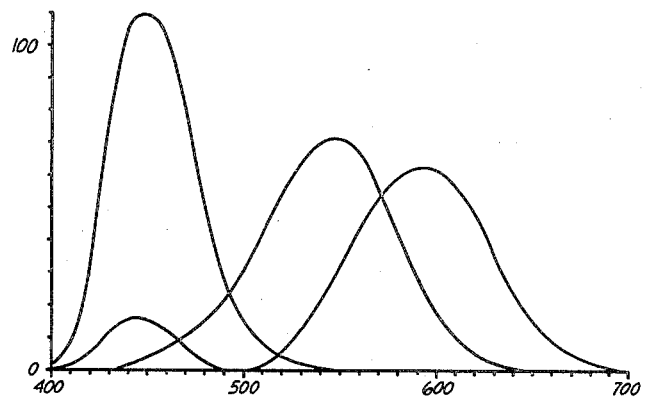
Fig. 9 is a graph of the spectral sensitivity versus wave length curve of three receptors adapted for use in the system where I utilize three imaginary primary color inputs.
Figure 10:
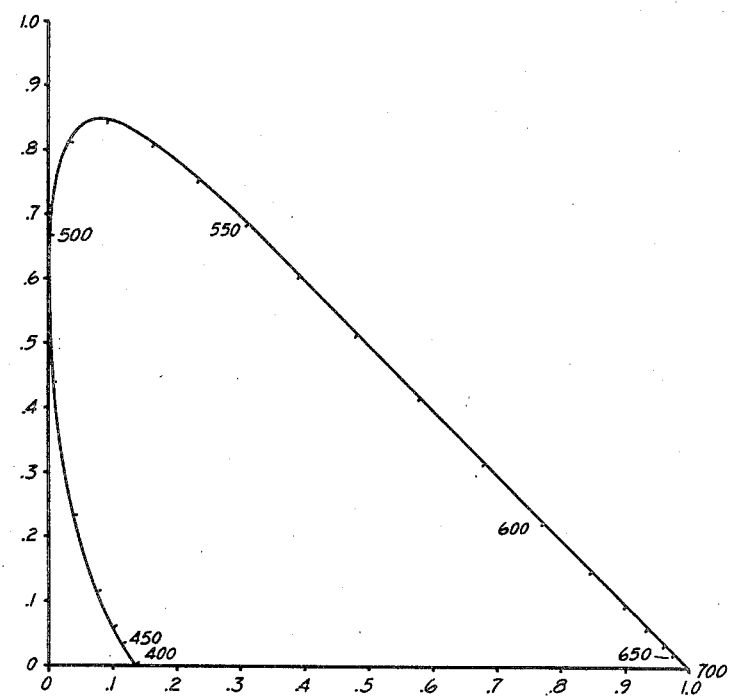
Fig. 10 is a chromacity diagram showing three imaginary primaries utilized by me in one form of my invention.

Such spectral response curves are shown in Fig. 9, for imaginary primary reproducing colors as shown on chromacity diagram shown in Fig. 10. This chromacity diagram has been calculated from data given in Hardy's "Handbook of Colorimetry." The vertical coordinate is $y$ and the horizontal coordinate is $x$. The coordinate $z$ is not shown on the diagram, but it may be found from the equation, $x+y+z=1$. The coordinates of the three imaginary reproducing colors are as follows:

First primary _____ $x=1, y=0, z=0$
Second primary _____ $x=0, y=1, z=0$
Third primary _____ $x=0, y=0, z=1$ As hereinbefore explained, using imaginary primary colors at the input end of the apparatus makes it unnecessary to have six receptors, two for each channel, so as to obtain both positive and negative spectral response. The color transformer indicated generally at 298 is adapted to transform the three imaginary primary color input electric signals from the three imaginary primary color channels 295, 296 and 297, into signals in three output color channels 299, 300 and 301 which correspond to real primary colors determined by the colored inks to be used in reproduction. During this color transformation process both positive and negative values of spectral response for each color channel are automatically compensated for. The details of one preferred form of the color transformer are illustrated schematically in Fig. 7 and will be discussed hereinafter.

Referring to Fig. 2, real primary output leads 299, 300 and 301 from the color transformer 298 are connected to the input of a multiplying mixer indicated generally at 302. The function of the mixer 302 is similar to the combined functions of the differential logarithmic amplifiers, additive or subtractive mixer, and antilogarithmic amplifiers, shown in Fig. 1 illustrating the first form of my invention, in that the multiplying or dividing mixer 302 acts so as to similarly multiply the signals in all three of the color signals so as to cause the instantaneous signal in one of the color channels which corresponds to the least colored ink coverage for that channel, to be maintained at a value corresponding to no colored ink coverage for that channel, the signals in the other two channels being multiplied equally. This is an equal multiplying action of all three of the signals in the various color channels. The amount of said multiplication is then used as the black output signal; in other words, the multiplying mixer 302 takes three input signals in three color channels and modifies them into three output signals in three color channels and a black output signal.

As hereinbefore explained, this direct multiplying action is mathematically the same as that achieved in the first form of my invention illustrated in Fig. 1 where logarithms are first taken, then addition to or subtraction from logarithms is accomplished for modifying three color channel input signals into three color channel output signals and a black color channel output signal, and the antilogarithm of the output signals is taken.

Details of the preferred form of multiplying mixer are illustrated in Fig. 6 and will be described hereinafter.

The three color channel outputs which have been modified by the multiplying mixer are connected to input leads 145, 146, and 147 of the ink color absorption corrector indicated generally at 49. The ink color absorption corrector 49 is the same as that shown in Fig. 1 and hereinbefore described and illustrated in Fig. 5.

The three color channel output leads 50, 51 and 52 from the superimposed ink color absorption corrector 49 are connected to linear light valves indicated generally at 53, 54 and 55. The black output channel from the multiplying mixer 302 is connected through the input lead 40 to the antilogarithmic amplifier 44, whose output channel 48 carries the black output signal. The reason for this is that the multiplying factor by which all of the color signals in the three color channels 145, 146, and 147 have been multiplied by the multiplying mixer 302 bears a logarithmic relation to the maximum signal with respect to light in the three color channels 299, 300 and 301, and it is desired that the actual black output signal be proportional to that maximum signal. This is because of the characteristics of the electron multiplier photo tubes 289, 290 and 291, the amplification factors of which are controlled by the multiplying mixer. This will be explained in greater detail in the specific description of the multiplying mixer given hereinafter.

The antilogarithmic amplifier 44 modifies the black input signal so that the black output signal is virtually antilogarithmic with respect to said black input signal. Said black output signal passes through black signal lead 48 to black linear light valve indicated generally at 56. As hereinbefore explained, rather than connect the black antilogarithmic amplifier 44 to the black linear light valve 56, the antilogarithmic amplifier 44 may be used directly as a nonlinear antilogarithmic light valve and the linear light valve 56 may be omitted entirely if so desired. The antilogarithmic amplifier 44 used either as an antilogarithmic amplifier or as an antilogarithmic light valve is of the type illustrated, described and claimed in my copending application.

The three color channel linear light valves 53, 54 and 55 and the black linear light valve 56 are adapted to vary the light from sources 57, 58, 59 and 60 which is focused upon four photosensitive mediums such as photographic films, or the like, indicated at 61, 62, 63 and 64. The films 61, 62, 63 and 64 are mounted upon a drum 65 which is adapted to be rotated and axially advanced by driving mechanism indicated generally at 66 and which is old in the art and will not be described herein.

Although in the system shown diagrammatically in Fig. 2, the color transformer is shown placed after the three photocells and before the multiplying mixer, in actuality the photocells are part of the multiplying mixer, and the photocells and the multiplying mixer shunt the color transformer and are connected to both input and output terminals thereof. In other words, the input terminals of the color transformer 298 are connected to the output terminals of the three photocells 289, 290, 291, and the output terminals of the color transformer 298 are connected to the input terminals of the multiplying mixer 302, and the multiplying mixer 302 is also connected back to the photocells 289, 290 and 291 in an inverse feedback manner for varying the amplification thereof. Therefore, the three photocells and the multiplying mixer will be described in detail first rather than the color transformer which is shown first diagrammatically in Fig. 2.

*Multiplying mixer*

Schematic drawing of the multiplying mixer is shown in Fig. 6. Referring to said figure, the three electron multiplying phototubes indicated generally at 289, 290 and 291 are the scanning photocells adapted to scan photographic color separation positives 286, 287 and 288 shown in Fig.

2. The electron multiplier phototubes 289, 290 and 291 may be of a type well known in the art, such as the RCA 931 electron multiplier phototube, or any other suitable tube. Said tube is an electro-statically focused electron multiplier phototube. The tapped resistors or voltage dividers 303, 304 and 305 are connected respectively across the plurality of electrodes known as dynodes and the cathodes 306, 307 and 308 of the electron multiplier phototubes 289, 290 and 291. The cathodes 306, 307 and 308 of the phototubes 289, 290 and 291 and the lower ends of the tapped resistors 303, 304 and 305, respectively, are connected in parallel to the anode 309 of an amplifier tube 310 and also to the black channel output terminal 311. The upper or last dynode of the electron multiplier phototubes 289, 290 and 291 and the upper ends of the tapped resistors 303, 304 and 305 are connected in parallel to positive power input terminal 312. The anodes 313, 314 and 315 of the electron multiplier phototubes 289, 290 and 291 are connected to phototube output terminals 316, 317 and 318 and then through plate resistors 319, 320 and 321 to positive power input terminals 322, 323 and 324, respectively. The output terminals 316, 317 and 318 are adapted to be connected to the input terminals of the color transformer 298 shown in Figs. 2 and 7. The output terminals of the color transformer 298 shown in Figs. 2 and 7 are adapted to be connected to input terminals 325, 326 and 327 of the multiplying mixer shown diagrammatically at 302 in Fig. 2 and in detail in Fig. 6. The input terminals 325, 326 and 327 of the multiplying mixer are connected to the grids 328, 329 and 330 of electron tubes 331, 332 and 333, respectively. The input terminals 325, 326 and 327 are also the output terminals of both the mixer and the color transformer and are adapted to be connected to the input terminals of the ink color absorption corrector shown generally at 49 in Fig. 2 and in detail in Fig. 5. The anodes 334, 335 and 336 of the electron tubes 331, 332 and 333 are connected to positive power input terminals 337, 338 and 339, respectively. The cathodes 340, 341 and 342 of the electron tubes 331, 332 and 333 are connected in parallel through a resistor 343 to negative power input terminal 344. Said three cathodes are also connected in parallel through a resistor 345 to the grid 346 of an amplifier tube 347. The grid 346 is also connected through a resistor 348 to negative power input terminal 349. The anode 350 of the amplifier tube 347 is connected through a plate resistor 351 to positive power input terminal 352. The anode 350 of the amplifier tube 347 is resistively coupled to the grid 353 of the amplifier tube 310 by means of resistors 354 and 355. Resistor 355 is connected to negative power input terminal 356. The cathodes 357 and 358 of the amplifier tubes 310 and 347 are connected in parallel to negative power input terminal 359. Tubes 331, 332 and 333 have a rectifier action in that the most positive grid of the three tubes determines the voltage of the three cathodes 340, 341 and 342 which are connected together. Tubes 347 and 310 are amplifier tubes and are used so that a very small voltage change of the cathodes 340, 341 and 342 will produce a large change in voltage across the tapped resistors 303, 304 and 305 across the dynodes of the electron multiplier photocells 289, 290 and 291 and thus, produce a very large change in the amplification or sensitivity in each of the three photocells. This system operates in an inverse feedback manner.

It can be seen that the amplification of each of the three photocells is equally changed by the multiplying mixer so that the three color output signals at terminals 325, 326 and 327 are such that the voltage of the one of the output terminals which corresponds to the least colored ink coverage of that channel is maintained at a value corresponding to no colored ink coverage for that channel and the other two channels are similarly multiplied. The color transformer is adapted to be positioned between the three photocells 289, 290 and 291 and the rectifier tubes 331, 332 and 333.

*Color transformer*

Fig. 7 illustrates in detail the color transformer indicated generally at 298 in Fig. 2. The three color channel input terminals to the color transformer are 361, 362 and 363. Said input terminals 361, 362 and 363 are connected to the grids 364, 365 and 366 of cathode follower tubes 367, 368 and 369, respectively. The anodes 370, 371 and 372 of the cathode follower tubes 367, 368 and 369 are connected to positive power input terminals 373, 374 and 375, respectively. The cathodes 376, 377 and 378 of the cathode follower tubes 367, 368 and 369 are respectively connected through cathode resistors 379, 380 and 381 to negative power input terminals 382, 383 and 384. The cathode 376 of the cathode follower tube 367 is also connected to the grid 385 of a phase inverter tube 386. The cathode 376 of the input cathode follower tube 367 of the first or upper color channel is connected to the grid 385 of the phase inverter tube 386. The anode 408 of the phase inverter tube 386 in the first color channel is connected through plate resistor 409 to a positive power input terminal 410. The anode 408 is also connected through a resistor 411 to the control grid 412 of the cathode follower tube 406 of the first color channel. The control grid 412 is also connected through a resistor 413 to negative power input terminal 414. The cathode 415 of the phase inverter tube 386 is connected through a resistor 416 to a negative power input terminal 417. The anode 418 of the cathode follower output tube 406 of the first color channel is connected to positive power input terminal 419. The cathode 405 of the output cathode follower tube 406 is connected through a cathode resistor 421 to a negative power input terminal 422. The cathode 405 of the output cathode follower tube 406 of the first color channel is also connected through resistor 404 to the output terminal 407.

The cathode 377 of the input cathode follower tube 368 of the second or middle color channel is connected to the grid 390 of the phase inverter tube 391. The anode 424 of the phase inverter tube 391 in the second color channel is connected through a plate resistor 425 to positive power input terminal 426. The anode 424 is also connected through a resistor 427 to the control grid 428 of the output cathode follower tube 399 of the second color channel. The control grid 428 is also connected through a resistor 429 to negative power input terminal 430. The cathode 431 of the phase inverter tube 391 is connected through a cathode resistor 432 to a negative power input terminal 433. The anode 434 of the output cathode follower tube 399 is connected to a positive power input terminal 435. The cathode 398 of the output cathode follower tube 399 of the second color channel is connected through a cathode resistor 436 to negative power input terminal 437. The cathode 398 of the output cathode follower tube 399 is connected to output terminal 438 through resistance 397. The cathode 378 of the input cathode follower tube 369 of the third or lower color channel is connected to grid 401 of the phase inverter tube 402. The anode 439 of the phase inverter tube 402 is connected through a plate resistor 440 to positive power input terminal 441. The anode 439 is also connected through a resistor 442 to the control grid 443 of the output cathode follower tube 394 of the third color channel. The control grid 443 is also connected through a resistor 444 to negative power input terminal 445. The cathode 446 of the phase inverter tube 402 is connected through a cathode resistor 447 to a negative power input terminal 448. The anode 449 of the output cathode follower tube 394 of the third color channel is connected to positive power input terminal 450. The cathode 393 of the output cathode follower tube 394 of the third color channel is connected through a cathode resistor 452 to negative power input terminal 453. The cathode 393 of the output cathode follower tube 394 is also connected to output terminal 395 through resistance 392. The three color channels are interconnected by means of the following resistances so that a part of the signal in each color channel can be subtracted from the signal in each of the other two color channels. Cathode 376 of the input cathode follower tube 367 of the first color channel is connected through resistance 387 to output terminal 395 of the third color channel and is also connected through resistance 396 to the output terminal 438 of the second color channel. Cathode 377 of the input cathode follower tube 368 of the second color channel is connected through resistance 389 to output terminal 395 of the third or lower color channel and is also connected through resistance 423 to the output terminal 407 of the first color channel. Cathode 378 of the input cathode follower tube 369 of the third or lower color channel is connected through resistance 403 to the output terminal 407 of the first color channel and is also connected through resistance 400 to the output terminal 438 of the second color channel.

The three color channel output terminals 407, 438 and 395 are adapted to be connected to the terminals 325, 326 and 327 of the multiplying mixer shown in Fig. 6. The input terminals 361, 362 and 363 of the color transformer as shown in Fig. 7 are adapted to be connected to the output terminals 316, 317 and 318 of the three photocells 389, 390 and 391 shown in Fig. 6. The input voltages at the input terminals of the color transformers 361, 362 and 363 vary the bias on the grids 364, 365 and 366 of the cathode follower tubes 367, 368, and 369 and cause the voltages of the three cathodes 376, 377 and 378 to follow said grid voltages closely.

The reason for the use of the cathode follower tubes 367, 368, 369, 406, 399 and 394 is the small incremental resistance to ground obtained through the use of said tubes. The resistances 404, 397, 392, 423, 403, 396, 400, 387 and 389 are all large in comparison to the incremental resistance between each of the cathodes of the cathode follower tubes 367, 368, 369, 406, 399 and 394, and ground. This makes the voltages of the cathodes of these cathode follower tubes practically independent of the currents through resistances, 404, 397, 392, 423, 403, 396, 400, 387 and 389. This is done in order to insure that the three output circuits do not interfere with each other. To be more specific, one of these output circuits is formed by the resistances 404, 423 and 403. Another of these output circuits is formed by the resistances 397, 396 and 400. The third output circuit is formed by the resistances 392, 389 and 400.

Tubes 386, 391 and 402 are phase inverter tubes. The cathode resistance of each is so chosen as to produce, as nearly as practicable, a linear relation between plate voltage and grid voltage. Tubes 406, 399 and 394 are output cathode follower tubes connected to the output of the phase inverter tubes 386, 391 and 402. The voltages from the cathode follower tubes 406, 399 and 394 are combined by means of the resistances shown. The output voltages of the resistance network which are fed to the output terminals 407, 438 and 395 correspond to the real primary color channel output voltages.

It should be mentioned here that photographic positives are being scanned and that the resistances in the resistance network are proportioned so as to give the greatest weight to the voltages from the output cathode follower tubes. Thus the primary voltage corresponding to the most light from the picture being reproduced is also the most positive.

It is the function of the color transformer to subtract from the signal in each color channel a portion of the signal in each of the color channels. For each color channel the change in voltage of the cathodes of the output cathode follower tubes is opposite in sign to the change in voltage of the cathode of the input cathode follower tube. The output cathode follower tube represents positive values of the signal and the input cathode follower tube represents negative values of the signal. By the use of the proper resistances the voltage at each output terminal represents the main portion of the signal from one color channel minus a portion of the signal from each of the other two color channels. This linear recombination of signals is for the purpose of converting the input color signals, which represent the values for imaginary reproducing primary colors, into output color signals which represent the values for real reproducing primary colors. More specifically, these real reproducing primary colors are the complements of the colors of the corresponding reproducing inks. The relationships between the output signals and the input signals of the color transformer are calculated by means of the principles of colorimetry as set forth hereinbefore.

Fig. 3 illustrates diagrammatically another general arrangement of various elements which may be utilized in making three correct color separation negatives and a correct black separation negative from six color separation positives, two positives to each of three color channels. This system is of the type for which the one positive of each color channel has a spectral sensitivity-versus-wave length curve positive in certain spectral regions and the other photographic positive of that color channel having a spectral sensitivity-versus-wave length curve positive in another and different spectral region.

Referring to said Fig. 3: A scanning drum indicated generally at 1, requiring six color separation positives 2, 3, 4, 5, 6 and 7, is rotated and axially moved by a suitable drive generally indicated at 8. Positioned within the scanning drum 1 are photocells 9, 10, 11, 12, 13 and 14 adapted to receive light from sources 15, 16, 17, 18, 19 and 20, respectively. The photoelectric cells 9 and 10 are connected as by leads 21 and 22 to the differential multiplying mixer indicated generally at 360. Photoelectric cells 11 and 12 are connected as by leads 24 and 25 to the differential multiplying mixer 360. Photoelectric cells 13 and 14 are connected as by leads 27 and 28 to the differential multiplying mixer 360. The leads 21 and 22 constitute a portion of one color channel. Leads 24 and 25 constitute a portion of a second color channel and the leads 27 and 28 constitute a portion of a third color channel.

In general, the scanning drum and drive, photographic positives, sources of light, scanning photocells, and the six leads comprising three color channels with the two leads of each channel going to the differential multiplying mixer 360, are the same as the similar elements in the first form of my invention shown in Fig. 1.

As shown in Fig. 3 the photocells operate in pairs as in the case of the differential logarithmic amplifiers previously described and shown diagrammatically in Fig. 1. Subtraction of the signal of one photocell from the signal of the second photocell of each pair is carried out in the same manner as shown for the differential amplifier, more completely described in my Patent No. 2,454,871. Means for this subtraction are not shown in Fig. 3. From each pair of photocells, then, there is produced a signal corresponding to a real reproducing primary color. By the proper choice of the color filters for making the positives 2, 3, 4, 5, 6 and 7, the three signals thus produced correspond exactly to the output signals from the color transformer 302 of Fig. 2. The three color signals thus produced are fed to the three input terminals of the multiplying mixer shown as 360 in Fig. 3 and also shown in Fig. 6. The cathodes of all six multiplier photocells shown in Fig. 3 are connected together and to the plate 309 of the tube 310 shown in Fig. 6. As shown in Fig. 6, the plate 309 of tube 310 is also connected to terminal 311. This is the black output terminal of the multiplier mixer and corresponds to line 40 of Fig. 3.

In the above manner the multiplying factors for all of the scanning phototubes are made equal. The net result is that the multiplying factor for each of the three color channels is equal and is controlled by the multiplying mixer so that the color signal corresponding to the maximum coverage of ink is regulated to a value corresponding essentially to zero coverage of ink.

The three color channel outputs from the differential multiplying mixer 360 are connected to input leads 45, 46 and 47 of the ink color absorption corrector indicated generally at 49. The superimposed ink color absorption corrector 49 is the same as that indicated generally in Figs. 1 and 2 also and more specifically in Fig. 5 and hereinbefore described.

The black output channel from the differential multiplying mixer 360 is connected to the input lead 40 of the antilogarithmic amplifier 44 in a manner similar to that shown in Fig. 2. The antilogarithmic amplifier 44 is not herein described since it is illustrated, described, and claimed in my copending application, Serial No. 702,172.

The black output lead 48 of the antilogarithmic amplifier 44 is connected to black linear light valve indicated generally at 56. As hereinbefore mentioned, the black linear light valve 56 may be dispensed with entirely and the antilogarithmic amplifier 44 used as an antilogarithmic nonlinear light valve as described in my copending application.

The color channel output leads 50, 51 and 52 of the ink color absorption corrector 49 are connected to linear light valves 53, 54 and 55. The four linear light valves 53, 54, 55 and 56 are adapted to vary the light from light sources 57, 58, 59 and 60, which is focused upon photosensitive mediums such as four photographic filaments 61, 62, 63 and 64 or the like, which are mounted upon a drum indicated generally at 65 and which is adapted to be rotated and axially moved by a suitable drive indicated generally at 66.

In general, the input portion of the system shown diagrammatically in Fig. 3 is much like the input portion of the system shown diagrammatically in Fig. 1 and the output portion of the system shown diagrammatically in Fig. 3 is much like the output portion of the system shown diagrammatically in Fig. 2.

*Compensator*

Figure 8:
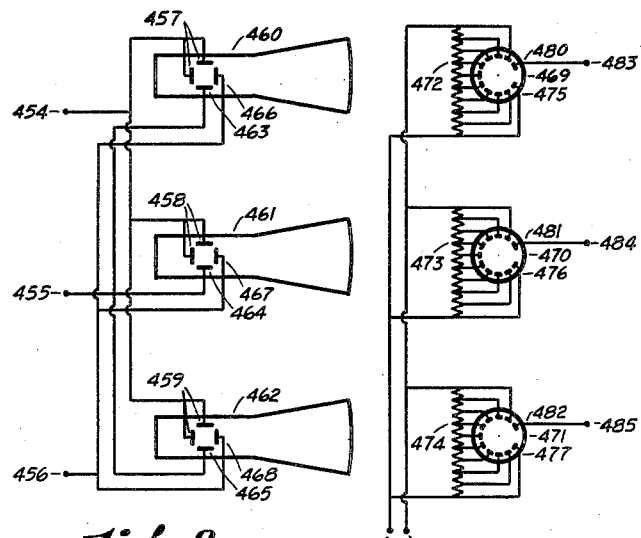
Fig. 8 is a wiring diagram schematically illustrating the compensator of my invention.

Fig. 8 illustrates what I have called a compensator. This compensator may combine the functions of color transformer of my invention shown diagrammatically in Fig. 2 and in detail in Fig. 7 and described hereinbefore, and the function of the ink color absorption corrector of my invention shown diagrammatically in Figs. 1, 2 and 3 and in detail in Fig. 5 and described hereinbefore.

The compensator may act as either a color transformer or an ink color absorption corrector or both if so desired. It may also be used as will hereinafter be explained in systems for making a colored reproduction or facsimile by spraying ink upon a suitable medium such as paper or the like. It may be used with linear or logarithmic output.

Referring to Fig. 8, the compensator is provided with three color channel input terminals 454, 455 and 456. The first color channel input terminal 454 is connected to similar deflecting plates 457, 458 and 459 of three cathode ray tubes indicated generally at 460, 461 and 462. The second color channel input terminal 455 is connected to similar deflection plates 463, 464 and 465 of the cathode ray tubes 460, 461 and 462 respectively. The third color channel input terminal 456 is connected to similar deflection plates 466, 467 and 468 of the cathode ray tubes 460, 461 and 462. The three color channel input terminals 454, 455 and 456 may be connected directly to the output terminals 325, 326 and 327 of the mixer shown in Fig. 6. In such case the photocell output terminals 316, 317 and 318 may be connected to the grids 325, 326, and 327, respectively of the three rectifier or selector tubes of the mixer directly or through cathode follower tubes with corresponding circuit changes.

Positioned opposite the ends of the cathode ray tubes 460, 461 and 462, the inner sides of which are coated with a material capable of fluorescing under the influence of the electron beam impinging thereon, are three electron multiplier phototubes indicated generally at 469, 470 and 471. These electron multiplier phototubes have tapped resistors or voltage dividers 472, 473 and 474 across the dynodes of said phototubes, the lower end of each resistor being connected to the photo cathodes 475, 476 and 477 of the phototubes 469, 470 and 471, respectively. The lower ends of the three tapped resistors 472, 473 and 474 and the three photo cathodes 475, 476 and 477 are connected in parallel to a negative power input terminal 478. The last dynode of each of the phototubes 469, 470 and 471 and the upper ends of the tapped resistors 472, 473 and 474 are connected in parallel to positive power input terminal 479. The anodes 480, 481 and 482 of the three phototubes 469, 470 and 471 are respectively connected to color channel output terminals 483, 484 and 485. The three color channel input voltages fed into the compensator at input terminals 454, 455 and 456, regulate the positions of the spots in the cathode ray tubes 460, 461 and 462, it being understood that for a given ratio of scanning currents the position of the spot in a cathode ray tube is fixed.

The cathode ray tubes 460, 461 and 462 have a constant spot intensity and the position of the spot is regulated by the scanning currents so that a given color or ratio of the scanning currents corresponds to a given or fixed location of the cathode ray beam. The fluorescent screen of each of the cathode ray tubes 460, 461 and 462 is calibratedly shaded by means not shown so as to give the proper light value to the photocell opposite it. The output current from the photocells 469, 470 and 471 delivered at the output terminals 483, 484 and 485 is taken as the color output. It can be seen that the shading of the screen may be so calibrated that the color transformer shown diagrammatically in Fig. 2 and in detail in Fig. 7 may be dispensed with. The superimposed ink color absorption corrector may also be eliminated through the use of the compensator shown in Fig. 8. The elements of the cathode ray tubes are not shown since they are old in the art.

Instead of regulating the most affected scanning current to have a fixed value as is done in the multiplying mixer, the sum of the scanning currents could be regulated to have a fixed value or any one of the scanning currents could be regulated to have a fixed value. Any system could be used which would give a single spot position of the cathode ray beam for a given set of ratios for the scanning currents.

A further development of this system would be the elimination of the photocells 469, 470 and 471 by modifying the cathode ray tubes 460, 461 and 462 by putting special plates in the cathode ray tubes 460, 461 and 462. Instead of the usual target screen, each cathode ray tube would be provided with two additional plates. The second plate or the one most remote from the electron gun, would be a continuous sheet used as a collector plate and would give the output current of the tube. The plate nearest the electron gun would be a screening plate and would be perforated according to an empirically determined pattern in order to allow the proper proportion of electrons to pass through to the next plate.

Another modification would make use of secondary emission. Each cathode ray tube would have a thin perforated metal plate placed on the glass surface of the tube where the light emitting surface usually is. Electrons striking this plate would cause many other electrons to leave it by secondary emission. These electrons would be collected by the usual collector plate on the inside of the tapered part of the tube which would be maintained at a slightly higher potential than the perforated plate so that it would serve as a collector. The electrons which struck the glass surface at the holes in the perforated plate would cause no secondary emission but would rebound and be collected by the collector plate. The perforated plate would form the output terminal of the tube. Such a perforated plate might be made by lithographing it on the glass surface or to lithograph a slightly conductive layer which would then be built up by electroplating. The perforations and screen pattern would, of course, have to be very small so as not to introduce discontinuity in the output current.

Another aspect of this process concerns the use of more than three colored inks. In the half-tone printing process the number of colored inks which can now be used is limited to three because the rows of dots must be printed at definite angles to avoid patterns in the printed picture. In the use of this process only two colored inks would be used at one time. If two colored inks were never used together they could be printed at the same angle. For example, if four colored inks were used, the pairs of inks which would be used together would be 1 and 2, 2 and 3, 3 and 4 and 4 and 1. 3 and 1, for example, would not be used together and could be printed at the same angle. The same would be true of 2 and 4. Thus, only two angles would be necessary for printing with the four colored inks.

In a similar manner it can be determined that an odd number of colored inks require three angles and that an even number of colored inks require only two angles for printing. By the use of more than three inks a much wider color range would be made available and more of the vivid colors in paintings and in nature could be reproduced.

The hereinbefore described systems utilizing the compensator of my invention are the only systems known to me that can be adapted for use in a printing process using more than three colored inks.

The compensator of my invention hereinbefore described in detail and illustrated in Fig. 8, may be connected to the three color channel output terminals of the additive and substractive mixer indicated generally at 36 in Fig. 1 in place of the balance of the system shown in Fig. 1. The color channel outputs of the compensator may be connected directly to a reproducing head of the type shown in my copending application Serial No. 702,174, filed October 9, 1946, or to any other reproducing head adapted to spray colored inks upon a suitable surface such as paper or the like in linear relation to the input signal. The black output terminal of the additive or substractive mixer is similarly connected to the reproducing head mentioned.

The compensator shown in Fig. 8 may also be connected to the output terminals of the multiplying mixer indicated generally at 298 in Fig. 2. The color transformer indicated generally at 298 may be left in the system or dispensed with entirely as desired. The output terminals of the compensator described in detail in Fig. 8 may then be connected to suitable reproducing means of the type shown in my copending application, Serial No. 702,174, adapted to spray various colored inks shown upon a suitable medium such as paper or the like in linear relation to the input signal. The black channel output from the multiplying mixer 298 is also similarly connected to the reproducing head mentioned.

The compensator illustrated in Fig. 8 and described hereinbefore in detail may also be connected to the three color channel outputs of the differential multiplying mixer 360 shown diagrammatically in Fig. 3. The three color channel outputs from the compensator may then be connected to a reproducing head means of the type shown in my copending application, Serial No. 702,174, or any other suitable reproducing head adapted to spray variously colored inks upon a suitable medium such as paper or the like in linear relation to the input signals. The black output channel from the differential multiplying mixer 360 is also connected to the reproducing head mentioned.

It should be understood that the output terminals of the compensator in any of the systems may be connected to light valves for making photographic color separation images if so desired. In such case, the black light valve output as hereinbefore explained, must be linear and not logarithmic so the antilog of the black signal is taken.

Numerous modifications and variations of this idea are possible since all that is necessary is to properly calibrate the cathode ray tube set up in the compensator.

Numerous modifications and variations of this invention are possible. For example, in the mixer shown in detail in Fig. 6, the inverse feed back to the tapped resistors across the three phototubes may be changed. The inverse feed back may be utilized for modifying the intensity of the scanning light sources. These, for example, might be neon glow tubes or the like.

A second variation of the process is that alternating current could be used throughout. Television techniques could be borrowed and iconoscopes used instead of photocells. Variable m$\mu$ tubes could be used between the iconoscopes and the color transformer. The amplification factors of these tubes could be regulated by the control voltage from the multiplying mixer in order to give an equivalent of regulation of the sensitivity of the iconoscopes. The amplifiers for color correction could be variable m$\mu$ tubes.

Another possible modification might be to take the logarithms of the four output channels 50, 51, 52 and 48 with logarithmic amplifiers of the type shown in my copending application, Serial No. 702,172, in the systems shown diagrammatically in Figs. 1, 2 and 3. The logarithmic outputs may then be used in controlling a reproducing head of the type shown in my copending application Serial No. 702,174, filed October 9, 1946, or any other suitable reproducing head adapted to control the application of various colored inks and a black ink to a suitable medium such as paper, or the like, in linear relation to the input signals of the four channels.

Another possible modification might be to control suitable engraving or embossing means with the color output signals of the various systems for making printing plates or the like. The engraving head might be of the type disclosed in the beforementioned parent application, or any other suitable type.

Throughout this application numerous cathode follower tubes have been used to reduce the capacity effect or to obtain low output resistance. These tubes may be eliminated if so desired. The type of coupling may be varied within wide limits. Numerous other circuit arrangements may be used within the spirit and scope of this invention.

Throughout this application filaments and filament power supplies for the various tubes are not shown since they are old in the art and well known. The various positive power input terminals and the various negative power input terminals referred to, may be connected to suitable sources of electric power not shown.

The examples described and illustrated herein are exemplary only and are not intended to limit this invention. The scope of this application is limited only by the appended claims.

Throughout the specification and claims the term "superimposed" when used in connection with inks shall be taken to include both inks which are actually placed on top of one another at a point or inks which are mixed together and placed at a point, provided only that they are coextensive at the point.

Throughout the specification and claims reference is made to three color inputs being modified, translated, or transformed into three color outputs and a black output. It should be clearly understood that this does not means that at any given instant three color input signals are modified into three color output signals and a black output signal since at any given instant the total number of outputs is always equal or less than the number of color inputs. It merely has reference to the fact that I start with three input channels corresponding to three colors and I end up with four output channels corresponding to three colors and black which may be used in a "four color process" for color reproduction. It should also be understood that while I have specifically referred to three color channels, color signals, etc., and not more than two instantaneously effective color signals throughout the specification and claims for illustrative purposes, I do not limit myself thereby, and it should be understood that any desired number of color channels, signals, etc., are intended to be comprehended and included.

In defining my invention in the following claims, I find it necessary to refer to the relative strength of one signal as among two or more color signals at any given instant. Since the scanning phototube upon which falls the greatest amount of light at any moment, and which hence has the greatest output current, controls a channel which will eventually deposit the least ink (in my invention, virtually zero), the use of "maximum" or "minimum" as applied to a signal would lead to ambiguity. I therefore make such terms in the claims unambiguous by adding the qualifying phrase "with respect to light" or "with respect to ink," the words "light" and "ink" having reference to a system wherein pictorial positives are being scanned. The expression "maximum signal with respect to light" therefore defines the signal in that channel whose phototube is receiving the greatest amount of light from a pictorial positive. Similarly, the expression "minimum signal with respect to ink" defines the signal in that channel which will ultimately control the depositing of the least ink on a positive pictorial reproduction.

I claim:

1. In an apparatus adapted to produce three channels of corrected color output signals instantaneously carrying not more than two effective color output signals and a black output signal from three differential input signals in three color channels from scanning means, the combination of: a multiplier phototube for each color channel having an anode, a cathode, and a plurality of secondary emission dynodes electrostatically spaced between said anode and cathode; means connecting together and to a source of constant potential the dynode of each phototube electrostatically nearest its respective anode; means connecting together and to a regulated potential said cathodes; electronic means for continuously selecting the signal in said channels which is instantaneously maximum with respect to light and for regulating the potential of said cathodes so that the selected signal is maintained in an inverse feedback manner at a value corresponding to virtually zero ink coverage for that channel, said regulated potential constituting the black output signal; and electronic color corrector means responsive to the color channel signals and arranged to correct said signals to compensate for the overlapping of color absorption characteristics of inks to be superimposed in color reproduction.

2. An apparatus of the character stated in claim 1 wherein the color corrector means includes three color channels therein each having cathode ray tube means arranged for bi-directional deflection of the electron stream therein in accordance with the input color channel signals to the color corrector means, a fluorescent target screen in said cathode-ray tube, an output signal photocell in operative relation with said fluorescent target screen, and a calibretically shaded screen between said fluorescent target screen and said photocell, changes in optical density of said shaded screen being smoothly gradated.

3. An apparatus of the character stated in claim 1 wherein the color corrector means includes three color channels therein each having cathode ray tube means arranged for bi-directional deflection of the electron stream therein in accordance with the input color channel signals to the color corrector means, each said cathode-ray tube means having therein an output collector electrode receiving electrons from the electron stream and a calibretically perforated screen between the electron source and the output collector electrode arranged so that the proportion of electrons reaching the output electrode is a continuous function of the bi-directional deflection position of the electron stream.

4. An apparatus of the character stated in claim 1 wherein the color corrector means includes three color channels therein each having cathode-ray tube means arranged for bi-directional deflection of the electron stream therein in accordance with the input color channel signals to the color corrector means, each said cathode ray tube means being arranged so that the color output signal in that channel will be a continuous function of the bi-directional position of the electron stream.

5. In an apparatus adapted to produce three channels of corrected color output signals instantaneously carrying out more than two effective color output signals and a black output signal from three input color signals in three color channels from scanning means, the combination of: electronic color transformer means responsive to the color channel signals and arranged to transform said signals into signals corresponding to different primary reproducing colors from the primary reproducing colors corresponding to the input signals; a multiplier phototube for each color channel having an anode, a cathode, and a plurality of secondary emission dynodes electrostatically spaced between said anode and cathode; means connecting together and to a source of constant potential the dynode of each phototube electrostatically nearest its respective anode; means connecting together and to a regulated potential said cathodes; electronic means for continuously selecting the signal in said channels which is instantaneously maximum with respect to light and for regulating the potential of said cathodes so that the selected signal is maintained in an inverse feedback manner at a value corresponding to virtually zero ink coverage for that channel, said regulated potential constituting the black output signal; and electronic color corrector means responsive to the color channel signals and arranged to correct said signals to compensate for the overlapping of color absorption characteristics of inks to be superimposed in color reproduction.

6. An apparatus of the character stated in claim 5 wherein the color corrector means includes three color channels therein each having cathode ray tube means arranged for bi-directional deflection of the electron stream therein in accordance with the input color channel signals to the color corrector means, a fluorescent target screen in said cathode ray tube, an output signal photocell in operative relation with said fluorescent target screen and a calibretically shaded screen between said fluorescent target screen and said photocell, changes in optical density of said shaded screen being smoothly gradated.

7. An apparatus of the character stated in claim 5, wherein the color corrector means includes three color channels therein each having cathode ray tube means arranged for bi-directional deflection of the electron stream therein in accordance with the input color channel signals to the color corrector means, each said cathode ray tube means having therein an output collector electrode receiving electrons from the electron stream and a calibretically perforated screen between the electron source and the output collector electrode arranged so that the proportion of electrons reaching the output electrode is a continuous function of the bi-directional deflection position of the electron stream.

8. An apparatus of the character stated in claim 5, wherein the color corrector means includes three color channels therein each having cathode ray tube means arranged for bi-directional deflection of the electron stream therein in accordance with the input color channel signals to the color corrector means, each said cathode ray tube means being arranged so that the color output signal in that channel will be a continuous function of the bi-directional deflection position of the electron stream.

9. In an apparatus adapted to produce three channels of corrected color output signals instantaneously carrying not more than two effective color output signals and a black output signal from three input color signals in three color channels from scanning means, a multiplier phototube for each color channel having an anode, a cathode, and a plurality of secondary emission dynodes electrostatically spaced between said anode and cathode; means connecting together and to a source of constant potential the dynode of each phototube electrostatically nearest its respective anode; means connecting together and to a regulated potential said cathodes; electronic means for continuously selecting the signal in said channels which is instantaneously maximum with respect to light and for regulating the potential of said cathodes so that the selected signal is maintained in an inverse feedback manner at a value corresponding to virtually zero ink coverage for that channel, said regulated potential constituting the black output signal.

10. In an apparatus adapted to produce three channels of corrected color output signals instantaneously carrying not more than two effective color output signals and a black output signal from three input color signals in three color channels from scanning means, a multiplier phototube for each color channel having an anode, a cathode, and a plurality of secondary emission dynodes electrostatically spaced between said anode and cathode; means connecting together and to a source of constant potential the dynode of each phototube electrostatically nearest its respective anode; means connecting together and to a regulated potential said cathodes; and electronic means for continuously regulating the potential of said cathodes so that a linear combination of the output signals is maintained in an inverse feedback manner at a virtually constant value, said regulated potential constituting the black output signal.

11. An apparatus in accordance with claim 10 including color corrector means having three color channels therein, each having cathode ray tube means arranged for bi-directional deflection of the electron stream therein in accordance with the input color channel signals to the color corrector means, a fluorescent target screen in said cathode ray tube, an output signal photocell in operative relation with said fluorescent target screen, and a calibretically shaded screen between said fluorescent target screen and said photocell, changes in optical density of said shaded screen being smoothly gradated.

12. An apparatus in accordance with claim 10 wherein the color corrector means includes three color channels therein each having cathode ray tube means arranged for bi-directional deflection of the electron stream therein in accordance with the input color channel signals to the color corrector means, each said cathode ray tube means having therein an output collector electrode receiving electrons from the electron stream and a calibretically perforated screen between the electron source and the output collector electrode arranged so that the proportion of electrons reaching the output electrode is a continuous function of the bi-directional deflection position of the electron stream.

13. An apparatus in accordance with claim 1 wherein said color corrector means includes means for selecting the minimum signal with respect to ink of each pair of color signals, and means for altering each signal of a pair by a value proportional to said selected minimum signal.

14. An apparatus in accordance with claim 5 wherein said color corrector means includes means for selecting the minimum signal with respect to ink of each pair of color signals, and means for altering each signal of a pair by a value proportional to said selected minimum signal.

NORMAN R. GUNDERSON.

REFERENCES CITED

The following references are of record in the file of this patent:

UNITED STATES PATENTS

| Number | Name | Date |
|---|---|---|
| 2,165,168 | Hardy | July 4, 1939 |
| 2,185,139 | Wurzburg | Dec. 26, 1939 |
| 2,231,668 | Hall | Feb. 11, 1941 |
| 2,231,669 | Hall | Feb. 11, 1941 |
| 2,249,522 | Hall | July 15, 1941 |
| 2,253,086 | Murray | Aug. 19, 1941 |
| 2,272,638 | Hardy | Feb. 10, 1942 |
| 2,286,730 | Hall | June 16, 1942 |
| 2,313,542 | Hall | Mar. 9, 1943 |
| 2,313,543 | Hall | Mar. 9, 1943 |
| 2,316,581 | Hardy | Apr. 13, 1943 |
| 2,375,966 | Valensi | May 15, 1945 |
| 2,413,706 | Gunderson | Jan. 7, 1947 |
| 2,415,051 | Thompson | Jan. 18, 1947 |
| 2,434,561 | Hardy | Jan. 13, 1948 |